US007506304B2

(12) United States Patent
Morrow et al.

(10) Patent No.: US 7,506,304 B2
(45) Date of Patent: Mar. 17, 2009

(54) GRAPHICAL DATA FLOW PROGRAMMING ENVIRONMENT WITH FIRST MODEL OF COMPUTATION THAT INCLUDES A STRUCTURE SUPPORTING SECOND MODEL OF COMPUTATION

(75) Inventors: Gregory O. Morrow, Austin, TX (US); John C. Limroth, Austin, TX (US); Jeffrey L. Kodosky, Austin, TX (US); Steven W. Rogers, Austin, TX (US); Kevin Hogan, Austin, TX (US); Hugo A. Andrade, Austin, TX (US)

(73) Assignee: National Instruments Corporation, Austin, TX (US)

( * ) Notice: Subject to any disclaimer, the term of this patent is extended or adjusted under 35 U.S.C. 154(b) by 965 days.

(21) Appl. No.: 10/869,572

(22) Filed: Jun. 16, 2004

(65) Prior Publication Data

US 2005/0257194 A1 Nov. 17, 2005

Related U.S. Application Data

(60) Provisional application No. 60/571,205, filed on May 14, 2004.

(51) Int. Cl.
*G06F 9/44* (2006.01)
(52) U.S. Cl. .................. 717/109; 717/113; 715/763
(58) Field of Classification Search .............. 717/1, 717/105, 107, 109, 100, 104, 106, 113; 703/19; 715/762, 763
See application file for complete search history.

(56) References Cited

U.S. PATENT DOCUMENTS 4,796,179 A   1/1989   Lehman et al.
4,860,204 A * 8/1989   Gendron et al. ............. 717/109
5,210,837 A   5/1993   Wiecek
5,481,741 A   1/1996   McKaskle et al.
5,612,866 A   3/1997   Savanyo et al.
5,732,277 A   3/1998   Kodosky et al.
6,219,628 B1  4/2001   Kodosky et al.

(Continued)

OTHER PUBLICATIONS

International search report and written opinion, application No. PCT/US2005/016630 mailed Feb. 21, 2006.

(Continued)

*Primary Examiner*—Van H Nguyen
(74) *Attorney, Agent, or Firm*—Meyertons Hood Kivlin Kowert & Goetzel, P.C.; Jeffrey C. Hood; Mark S. Williams

(57) ABSTRACT

System and method for creating a graphical program that uses multiple models of computation (MoC). A first plurality of graphical program elements is assembled in a graphical program in response to first input, where the assembled first plurality of graphical program elements have a first MoC. A structure is displayed in the graphical program indicating use of a second MoC for graphical program elements comprised within the interior of the structure. A second plurality of graphical program elements is assembled within the structure in response to second input, where the assembled second plurality of graphical program elements have the second MoC. The graphical program is executable to perform a function, for example, by executing the assembled first plurality of graphical program elements in accordance with the first model of computation, and executing the assembled second plurality of graphical program elements in accordance with the second model of computation.

61 Claims, 21 Drawing Sheets

U.S. PATENT DOCUMENTS

| | | | |
|---|---|---|---|
| 6,272,672 B1* | 8/2001 | Conway | 717/107 |
| 2001/0020291 A1 | 9/2001 | Kudukoli et al. | |
| 2001/0052110 A1* | 12/2001 | Orbanes et al. | 717/1 |
| 2002/0089538 A1 | 7/2002 | Wenzel et al. | |
| 2003/0046663 A1 | 3/2003 | Rogers et al. | |
| 2003/0071842 A1 | 4/2003 | King et al. | |
| 2003/0071845 A1 | 4/2003 | King et al. | |
| 2003/0132964 A1 | 7/2003 | Santori et al. | |
| 2004/0107414 A1* | 6/2004 | Bronicki et al. | 717/105 |
| 2007/0203683 A1* | 8/2007 | Kornerup et al. | 703/19 |

OTHER PUBLICATIONS

Wan-Teh Chang, Soonhoi Ha, and Edward A. Lee; "Heterogeneous Simulation—Mixing Discrete-Event Models with Dataflow"; Journal of VLSI Signal Processing; 1997; pp. 127-144; The Netherlands.

Joseph Buck, Soonhoi Ha, Edward A. Lee and David G. Messerschmitt; "Ptolemy: A Framework for Simulating and Prototyping Heterogeneous Systems"; International Journal in Computer Simulation; 1994; pp. 155-182; vol. 4, No. 2.

Hugo A. Andrade and Scott Kovner; "Software Synthesis from Dataflow Models for G and LabVIEW™"; Proc. IEEE Asilomar Conference on Signals, Systems, and Computers; Nov. 1998; pp. 1705-1709; vol. 2.

Loic Besnard, Patricia Bournai, Thierry Gautier, Nicolas Halbwachs, Simin Nadjm-Tehrani, and Annie Ressouche; "Design of a multi-formalism application and distribution in a data-flow context: an example"; 12$^{th}$ International Symposium on Languages for International Programming; Jun. 1999; pp. 8-30; Athens, Greece.

Edwards, Stephen Anthony, *The Specification and Execution of Heterogeneous Synchronous Reactive Systems*, Doctoral Dissertation, University of California, Berkeley, 1997, 170 pages.

Pino, Jose Luis and Khalil Kalbasi, "Cosimulating Synchronous DSP Designs with Analog RF Circuits," Hewlett Packard, 1999, 15 pages.

Altium Limited, Press Release Entitled Altium Nexar release heads "LiveDesign-enabled 2004 product line-up," Feb. 17, 2004, 3 pages.

AXYS Design Automation, Inc., Product Description for "MaxCore," 2002, 2 pages.

AXYS Design Automation, Inc., Product Description for "MaxSim," 2002, 2 pages.

"The Measurement and Automation Catalog 2004", National Instruments, 2004.

"Stateflow for State Diagram Modeling", Stateflow User's Guide, Version 4, 1997.

Simulink Model-Based and System-Based Design Using Simulink, Version 5, Jul. 2002.

Simulink Release Notes, Simulink, Jun. 2, 2004 (73 pages).

* cited by examiner

- ## Data Structure Used:
  AdjacencyList

US 7,506,304 B2

GRAPHICAL DATA FLOW PROGRAMMING ENVIRONMENT WITH FIRST MODEL OF COMPUTATION THAT INCLUDES A STRUCTURE SUPPORTING SECOND MODEL OF COMPUTATION

PRIORITY DATA

This application claims benefit of priority of U.S. Provisional Application Ser. No. 60/571,205 titled "Graphical Data Flow Programming Environment with First Model of Computation that Includes a Structure Supporting Second Model of Computation" filed May 14, 2004, whose inventors were Gregory O. Morrow, John C. Limroth, Jeffrey L. Kodosky, Steven W. Rogers, Kevin Hogan, and Hugo A. Andrade.

FIELD OF THE INVENTION

The present invention relates to the field of graphical programming, and more particularly to a graphical data flow programming environment with a first model of computation that includes a structure supporting a second model of computation.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Different graphical programming systems may use different models of computation, e.g., different semantics, to specify or represent the functionality of the graphical programs. Examples of graphical program semantics include homogenous data flow, heterogeneous data flow, synchronous data flow, timed synchronous data flow, state machine, cyclostatic data flow, and dynamic data flow, and various combinations, among others. However, current graphical programming systems generally facilitate the development of graphical programs or data flow diagrams with only a single model of computation or type of data flow semantics.

There are numerous applications where this restriction may limit the utility or applicability of the program. For example, in parallel with the development of the graphical programming model, computer-based simulations are increasingly used in the design and testing of systems, e.g., control, automation, digital signal processing, communication, etc., systems. In many cases, different models of computation, e.g., different data flow semantics may be suitable for different aspects of the system.

An exemplary graphical programming system that uses a homogenous data flow model of computation is the standard LabVIEW graphical programming system, provided by National Instruments Corporation, that includes the "G" graphical programming language, described above. LabVIEW is particularly effective for test and measurement applications. However, in many applications, there is a need to include simulation with the test and measurement functionality of the program. For example, in some applications, users need to run simulation models and/or controllers as part of their LabVIEW or LabVIEW Realtime applications. Technically, the running of simulations involves the numerical solution of ordinary differential equations or difference equations (discrete analogs of differential equations), both referred to herein as "differential equations", where the differential equations are specified in "control block diagram" notation, which is similar to G, consisting of nodes connected by signals, but where some feedback cycles are allowed.

Currently LabVIEW users have the following alternatives to address this issue: 1) interface to a model or controller written in a simulation system development environment, e.g., Mathwork's Simulink, through a model-specific DLL, e.g., generated by Simulink Realtime Workshop; and 2) write the simulation natively in G using special tools and features directed at simulation, e.g., either the GSIM toolkit or the "Advanced Control" toolkit (which is the point by point version of GSIM.), both of which are based on G (and provided by National Instruments Corporation). Note that in the following, the term "VI" (Virtual Instrument) refers to a graphical program node. Similarly, the term "subVI" refers to a graphical program node that encapsulates a group of graphical program nodes, i.e., that represents a sub-diagram within a larger diagram.

The current G-based implementation has several limitations, including for example, the following:

1. The breaking of wiring cycles is accomplished by using control/local pairs or shift registers on the top level diagram. In the case of shift registers, the resulting diagram does not look like a control block diagram. In either case, the user is exposed to a situation where there are values from the current iteration as well as the previous iteration. The cosmetic problem could be alleviated by a "free range" shift register. The problem of data from two distinct iterations appearing simultaneously on the diagram is problematic, however, and may be difficult to solve.

2. The handling of hierarchies in the model nodes is problematic in GSIM. It can be shown that all feedback cycles must be broken on the top level diagram. This in turn implies that a subsystem that is written as a subVI cannot contain a feedback cycle. Elements of a complex model that would logically be encapsulated (e.g. the engine model is a subsystem of the whole-car model) therefore cannot be put into a subVI.

3. The implementation of certain types of ordinary differential equation (ODE) integrators is difficult or impossible in GSIM. Falling into this category are implicit solvers, multi-stage methods, and adaptive step-size methods. The problem in all of these cases is that these integration methods require the diagram specifying the differential equation to be evaluated multiple times per single "time step" of the solver. This introduces problems at source and sink nodes as well as in nodes that have memory (e.g., a filter.)

Many applications, such as, for example, most modern signal processing, e.g., modern communications applications, speech and image recognition systems, etc., are multi-rate systems, where program elements may execute at different rates. One model of computation that is used for designing multi-rate systems is synchronous data flow (SDF), which is well known to those skilled in the art. G, however, based on a homogenous dynamic model of computation, is restricted to single-rate execution, and thus there is currently no mechanism in LabVIEW to efficiently specify multi-rate systems. Users of such systems based on a homogenous data flow model of computation may deal with this limitation by 1) using different sized arrays for the inputs and the outputs of each VI, which is cumbersome and an inefficient use of memory; or 2) using independent loops running at different rates communicating through local or global variables, also tedious and cumbersome for the user.

Another aspect of different models of computation relates to scheduling, e.g., static compile-time scheduling vs. dynamic scheduling. In general, embedded digital signal processors (DSPs) have limited memory and processing power, and so the inclusion of a dynamic scheduler may not be feasible. However, the homogenous dynamic model of computation used by G utilizes dynamic scheduling and so may require a dynamic scheduler, which may limit the utility or application of LabVIEW graphical programs in these and other platforms and applications.

Note that as used herein, the term "homogenous data flow" specifically refers to models of computation or data flow diagrams with a single rate of execution, i.e., where each element in the data flow diagram has the same rate of execution, i.e., token production/consumption. Thus, a non-homogenous, or heterogeneous, data flow diagram refers to a data flow diagram that supports multiple rates of execution, i.e., that uses a multi-rate or heterogeneous model of computation. In contrast, the terms "heterogeneous system" and "heterogeneous graphical program" refer to the use of multiple models of computation in a single system or program.

Thus, it would be desirable to accommodate different models of computation, e.g., different data flow semantics, in a single graphical program.

SUMMARY OF THE INVENTION

Various embodiments of a system and method are presented for creating a graphical program that uses multiple models of computation, e.g., a data flow diagram with multiple data flow semantics. Note that while the term "model of computation" is more general than "data flow semantic", in a data flow application, i.e., where the graphical program is a data flow diagram that only implements or represents data flow as opposed to also including other models of computation, such as state diagrams, control flow, etc., the terms may be used synonymously. While the method below is described in terms of a data flow diagram with multiple data flow semantics, it should be noted that the method also generalizes to multiple models of computation included in a single graphical program, the data flow embodiment described being but an example of the more general approach.

A first plurality of graphical program elements may be assembled in a data flow diagram, e.g., a graphical program, in response to first input, where the assembled first plurality of graphical program elements have first data flow semantics. In other words, the assembled first plurality of graphical program elements may comprise a first portion of the data flow diagram in accordance with first data flow semantics. For example, the user may arrange on a display a plurality of nodes or icons and then interconnect the nodes to create the data flow diagram. In response to the user assembling the data flow diagram, data structures may be created and stored which represent the data flow diagram. The data flow diagram may thus comprise a plurality of interconnected nodes or icons which visually indicates the functionality of the data flow diagram. Note that the data flow diagram may also be considered to be a graphical program, or a portion of a graphical program. As noted above, the data flow diagram (graphical program) may comprise a block diagram and may also include a user interface portion or front panel portion. Where the data flow diagram includes a user interface portion, the user may optionally assemble the user interface on the display. As one example, the user may use the LabVIEW graphical programming development environment to create the data flow diagram or graphical program. In an alternate embodiment, the data flow diagram may be created by the user creating or specifying a prototype, followed by automatic or programmatic creation of the data flow diagram from the prototype, or in other manners, either by the user or programmatically, as desired.

In various embodiments, the first data flow semantics of the data flow diagram may be any of a wide variety of different data flow semantics. For example, in a preferred embodiment, the first data flow semantics may specify a homogenous model of computation, as used in LabVIEW data flow diagrams, e.g., the first data flow semantics may specify a single rate execution of graphical program elements, e.g., such that each graphical program element or node executes with the same frequency. In one embodiment, a graphical program that has a homogeneous model of computation necessarily supports parallelism, e.g., a graphical data flow diagram where the diagram may support concurrent execution paths.

In another embodiment, the first data flow semantics may not include explicit feedback connections to implement looping. In other words, the first data flow semantics may specify iterative processing via an implicit feedback mechanism, such as enclosing the function nodes to be executed iteratively in a graphical loop structure, such as a LabVIEW while or for loop structure, rather than via direct or explicit feedback loops between outputs and inputs of nodes. Thus, in one embodiment, the first data flow semantics may comprise graphical structure nodes that specify looping, wherein the graphical structure nodes do not include explicit feedback connections to implement looping. In one embodiment, the first data flow semantics may specify a single rate execution of graphical program elements, and may also not include explicit feedback connections to implement looping. In one embodiment, the first data flow semantics may comprise graphical structure nodes that specify conditional branching of operations. Note that in other embodiments, the nodes may be interconnected in control flow or execution flow formats, among other graphical programming formats.

A structure may then be displayed in the data flow diagram, e.g., in response to second input, where the structure indicates use of second data flow semantics for graphical program elements comprised within the structure. In other words, a structure may be placed in the data flow diagram that serves to demarcate between the first plurality of graphical program elements and the second plurality of graphical program elements. For example, in one embodiment, the structure may comprise a loop structure that is operable to enclose, surround, or otherwise visually distinguish graphical program elements comprised in the structure, e.g., from the first plurality of graphical program elements of the data flow diagram. The structure preferably comprises an interior portion, wherein graphical program elements may be assembled and displayed within the interior portion. In a preferred embodiment, the loop structure may be a LabVIEW loop structure, e.g., a for loop or a while loop, as provided in the LabVIEW graphical programming system. Examples of the structure are described in more detail below.

A second plurality of graphical program elements may then be assembled within the structure in response to third input. For example, in one embodiment the structure comprises a timed loop, and so the second plurality of graphical program elements may be placed inside the loop. The assembled second plurality of graphical program elements may comprise a second portion of the data flow diagram, in accordance with the second data flow semantics. As described above, and is well known to those skilled in the art of graphical programming techniques, in assembling the second plurality of graphical program elements in the structure, the user may interconnect the graphical program elements to specify and facilitate data flow between the elements, and may also connect a plurality of the graphical program elements with or to the structure.

In a preferred embodiment, the second data flow semantics specifies a different model of computation than the first data flow semantics, and thus the graphical program may represent a heterogeneous system, in that two different models of computation are included and supported in the graphical program. For example, in one embodiment, the second data flow semantics may support different syntax or formats, and/or a different rate of execution, from that of the first plurality of graphical program elements, e.g., control block notation, explicit feedback, etc., examples of which are described in more detail below. In another embodiment, the second data flow semantics may support multiple modes of execution among the graphical program elements (comprised in the structure), e.g., multiple rates of execution, and thus may use or support a heterogeneous model of computation. As noted above, the method of FIG. 5 is described in terms of data flow diagrams and data flow semantics, although this description is just one example of the more general case involving graphical programs and models of computation.

The resulting heterogeneous graphical program may be executable to perform a function, where the graphical program comprises a plurality of interconnected nodes that visually indicate functionality of the data flow diagram. As noted above, in one embodiment, the graphical program may comprise a data flow diagram. In a preferred embodiment, the data flow diagram may be operable to perform the function by executing the first portion of the data flow diagram in accordance with the first data flow semantics, and executing the second portion of the data flow diagram in accordance with the second data flow semantics. In other words, in one embodiment, the assembled graphical program elements of the data flow diagram may execute in accordance with their respective data flow semantics. Thus, the data flow diagram may represent or implement a heterogeneous system (i.e., supporting multiple data flow semantics or models of computation). It should be noted that although in the examples described herein only two different models of computation, e.g., data flow semantics, are utilized, in other embodiments, the number of different models of computation, e.g., data flow semantics supported concurrently in the data flow diagram, may be greater. Note also that in some embodiments, either or all of the two (or more) models of computation supported in the heterogeneous (multiple models of computation) graphical program may be homogenous (single rate) or heterogeneous (multi-rate). It should be further noted that in other embodiments, the graphical program may implement multiple models of computation that may or may not include data flow, but rather, may include any other models of computation as desired, including for example, state diagram, control flow, resource flow, SDF, and so forth.

Note also that the function may be any type of function desired. For example, in one embodiment, the data flow diagram may be operable to perform an industrial automation function, a process control function, and/or a test and measurement function, among others. Any other type of function may also be performed as desired, including, for example, functions related to analysis, e.g., data or image analysis, telecommunications, data or image processing, entertainment, science, medicine, and so forth.

Thus, the data flow diagram may optionally be executed to perform the function. In an embodiment where the data flow diagram includes a graphical user interface portion and a block diagram portion, during execution of the data flow diagram, the graphical user interface may be displayed on a display of a first computer system and the block diagram may execute on a second computer system. In another embodiment, at least a portion of the data flow diagram may be deployed to a programmable hardware element, e.g., an FPGA, and executed thereon. In other words, in one embodiment, at least a portion of the data flow diagram may be converted into a form suitable for deployment on a programmable hardware element. The converted at least a portion of the data flow diagram may be deployed onto the programmable hardware element, and the data flow diagram executed, where the converted at least a portion of the data flow diagram is executed on the programmable hardware element.

In one embodiment, executing the data flow diagram may include highlighting each graphical program element in the data flow diagram while the graphical program element is executing. In other words, during execution of the data flow diagram, each graphical program element may visually indicate when it is executing, e.g., by changing color, or otherwise changing its appearance.

In one embodiment, executing the second portion of the data flow diagram may include converting the second portion of the data flow diagram into graphical program code in accordance with the first data flow semantics, then executing the converted second portion, i.e., the resultant graphical program code, in accordance with the first data flow semantics. In one embodiment, the converted second portion may comprise a companion data flow diagram coupled to the first portion of the data flow diagram, where the companion data flow diagram executes in lieu of, or in conjunction with, the second portion of the data flow diagram. In one embodiment, the execution highlighting may be performed with respect to the first portion, the second portion, and/or the companion diagram. In a preferred embodiment, the companion diagram may be executed in lieu of the second portion of the data flow diagram, and any results or effects related to the companion diagram propagated back to the simulation diagram, e.g., for the user to view. Note that in different embodiments, the companion diagram may or may not be displayed to the user.

BRIEF DESCRIPTION OF THE DRAWINGS

A better understanding of the present invention can be obtained when the following detailed description of the preferred embodiment is considered in conjunction with the following drawings, in which.

Figure 1A:
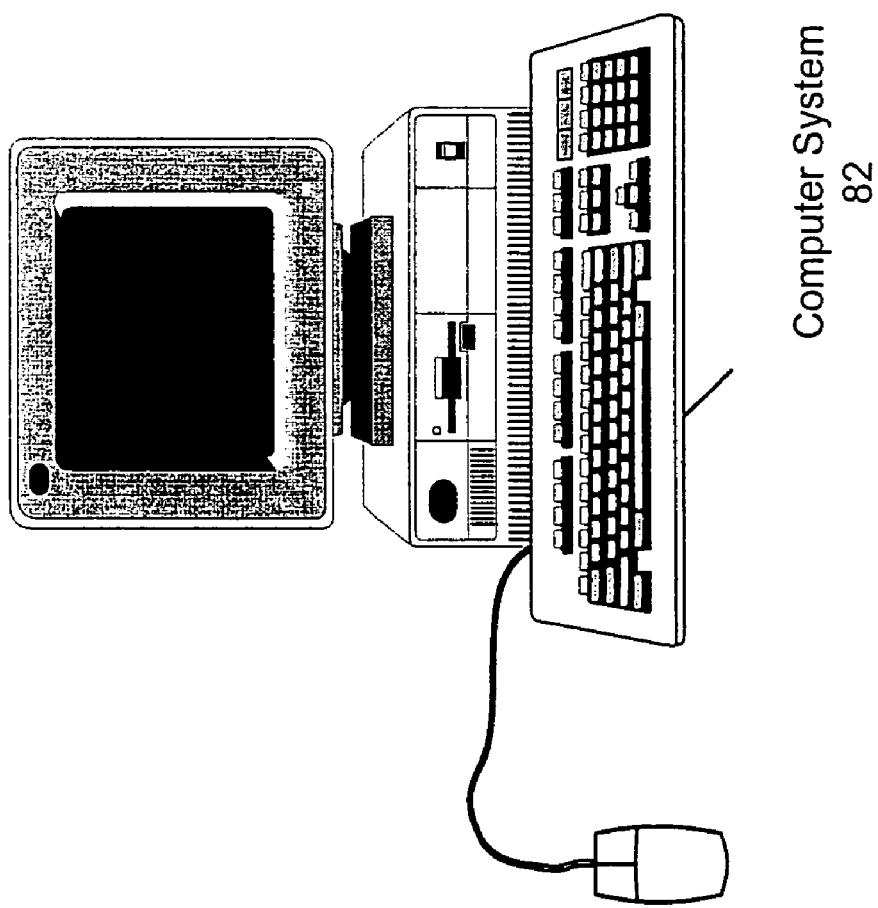
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,219,628 titled "System and Method for Converting Graphical Programs Into Hardware Implementations" filed Mar. 22, 2000.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/742,510 titled "System and Method for Programmatically Generating a Second Graphical Program Based on a First Graphical Program", filed Dec. 20, 2000.

U.S. patent application Ser. No. 10/094,198 titled "Self-Determining Behavior Node For Use In Creating A Graphical Program", filed Mar. 8, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

A graphical program that has a "homogenous model of computation" is a graphical program which is "single rate", i.e., where the semantics may specify a single rate execution of graphical program elements. In other words, each of the graphical program elements in the graphical program preferably has the same rate of execution, e.g., each element may execute the same number of times per execution of the graphical program, e.g., each element may produce and consume the same number of tokens per execution.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Model of Computation—a formal description that includes a syntax and rules for computing behavior (semantics) described by the syntax; used to specify the semantics of computation and concurrency. Examples of models of computation include, data flow, control flow, state machine (e.g., finite state machine), actor, parallel random access machine, continuous time, spatial/temporal, synchronous/reactive, discrete event, cycle driven, synchronous message passing, asynchronous message passing, rendezvous, Turing machine, tagged signal, Petri nets, homogenous, heterogeneous, single rate, multi-rate, and combinations thereof, among others. Examples of different data flow models of computation include homogenous data flow, heterogeneous data flow, synchronous data flow, timed synchronous data flow, cyclostatic data flow, and dynamic data flow, among others. Some data flow models of computation may support explicit feedback loops, where, for example, output from a graphical program element may be provide as input to the same element, either directly, or via one or more other elements.

For example, the "G" graphical programming language, used in the LabVIEW™ graphical program development environment provided by National Instruments Corporation, supports a homogeneous (i.e., single rate) data flow model of computation that does not include explicit feedback loops. In contrast, Simulink™, provided by The MathWorks, Inc., supports a heterogeneous (multi-rate) data flow model of computation that includes explicit feedback loops.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute a graphical program configured to accommodate or support multiple models of computation, e.g., multiple data flow semantics. One embodiment of a method for creating a graphical program operable to execute according to multiple models of computation is described below.

As shown in FIG. 1A, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
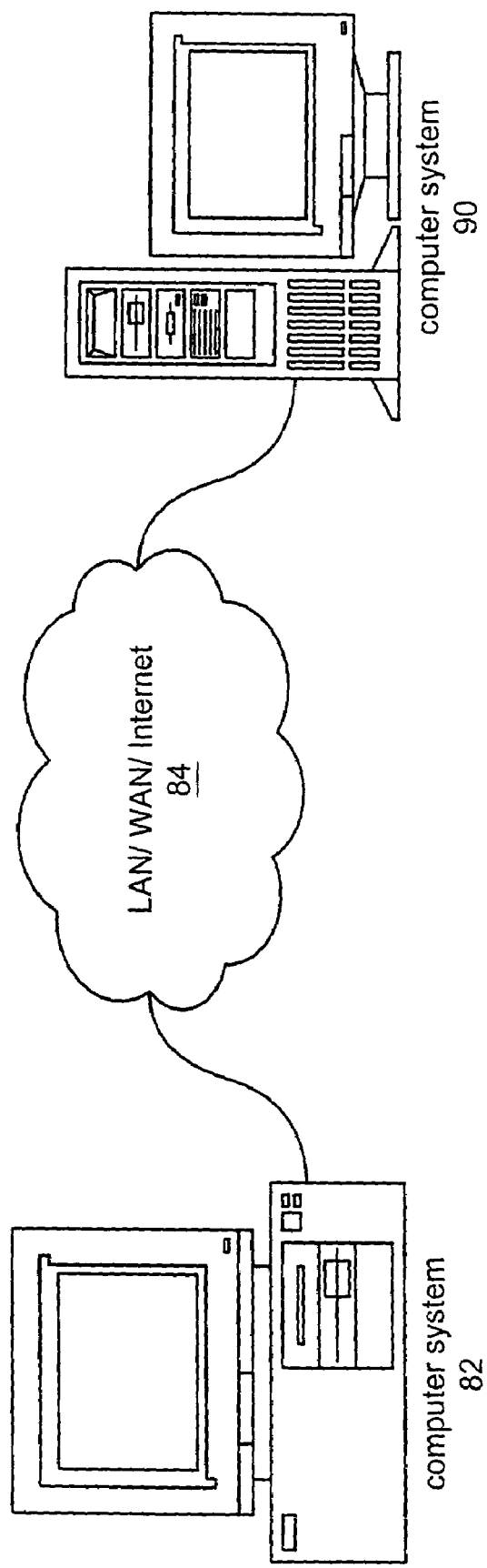
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
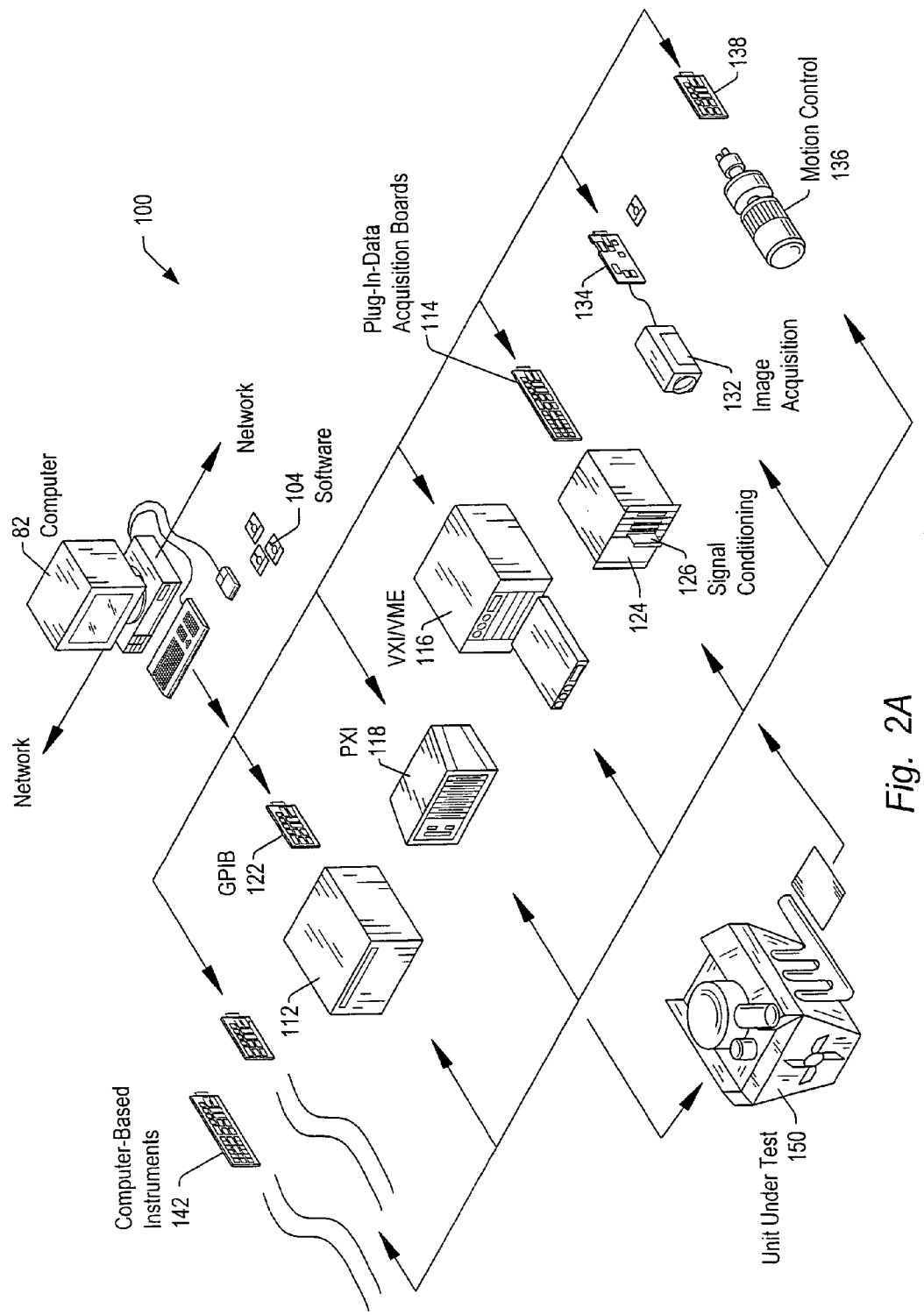
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
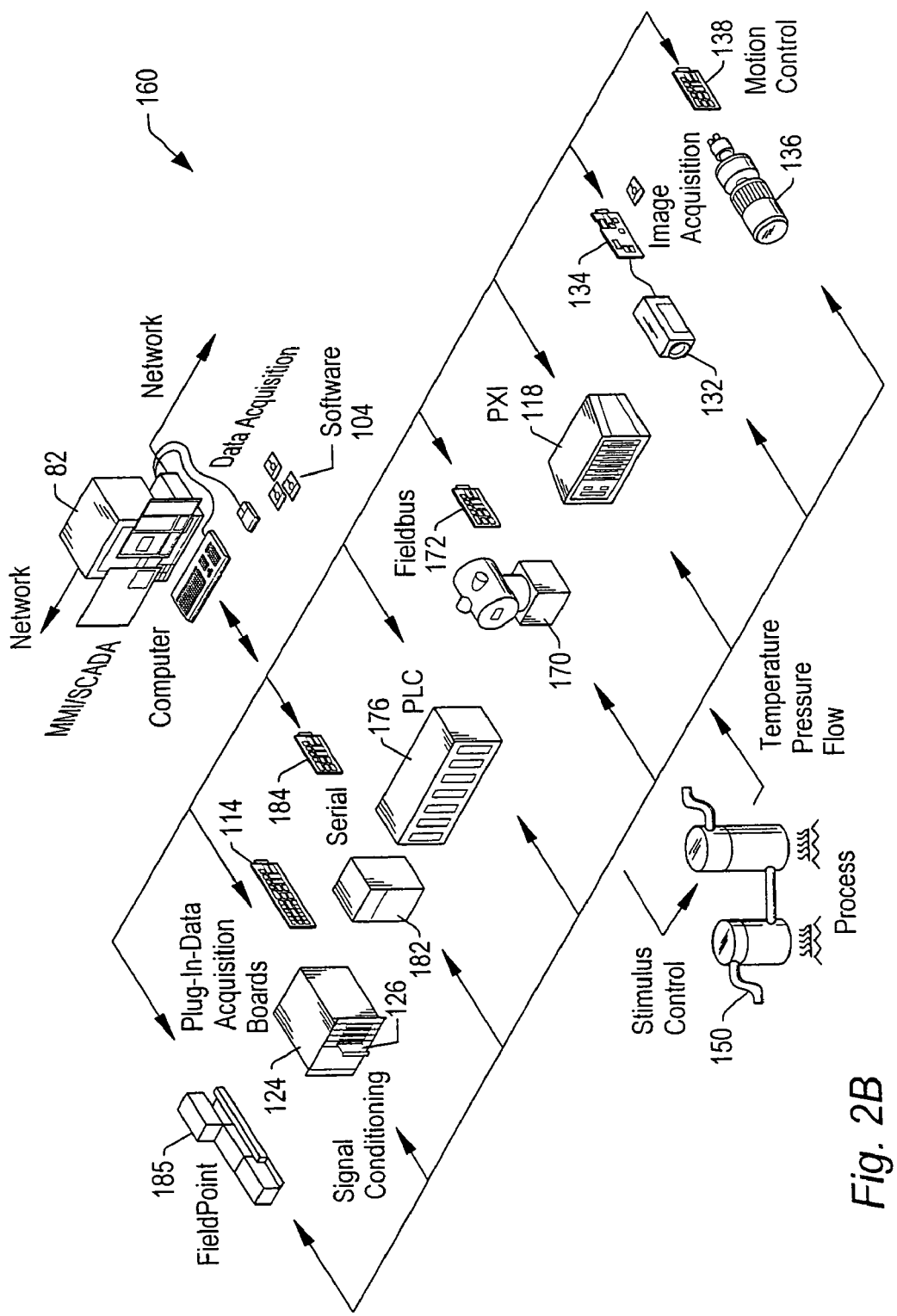
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
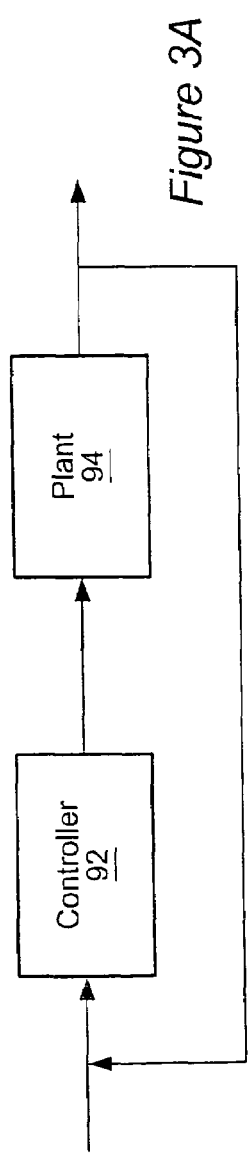
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
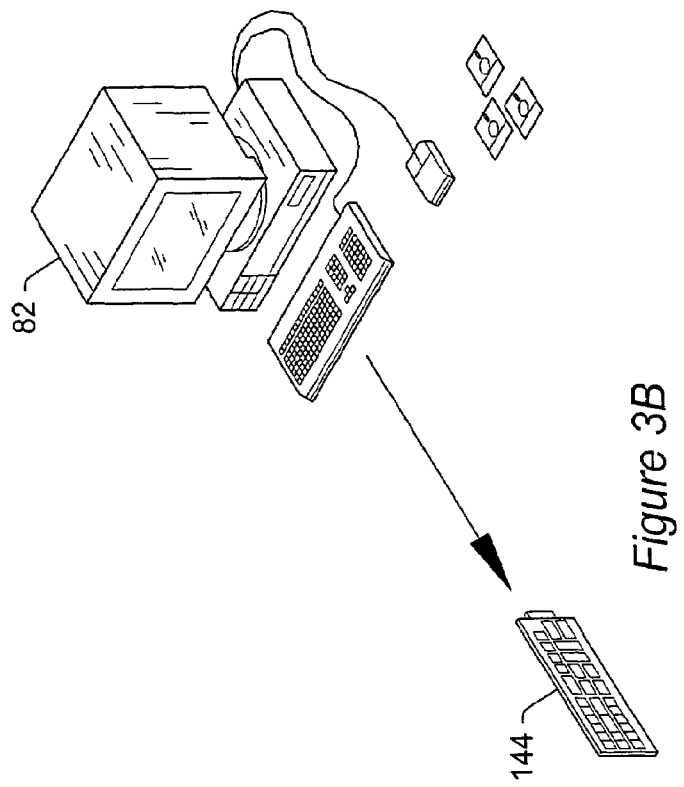
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element. the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
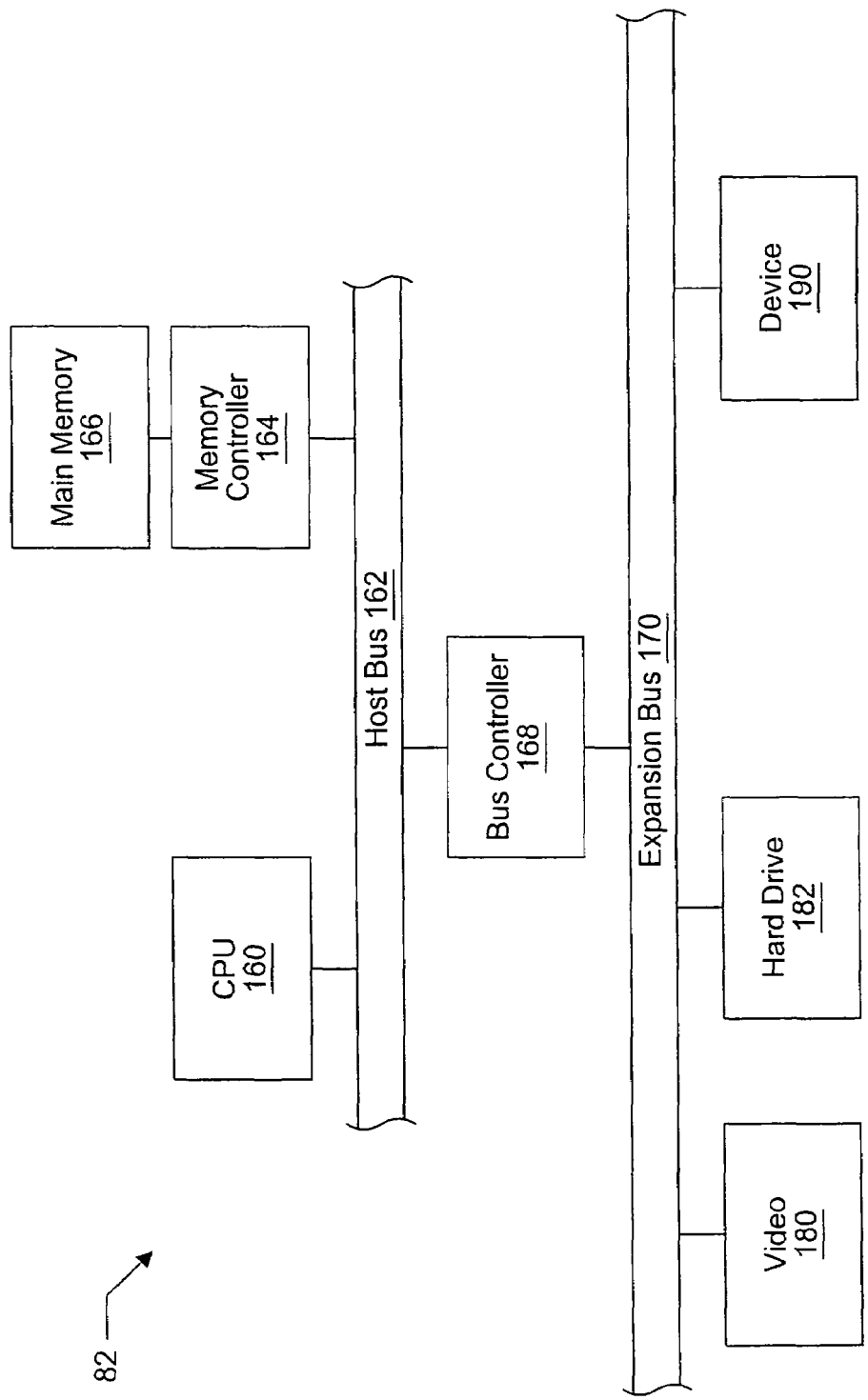
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to execute under multiple models of computation, e.g., multiple data flow semantics. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
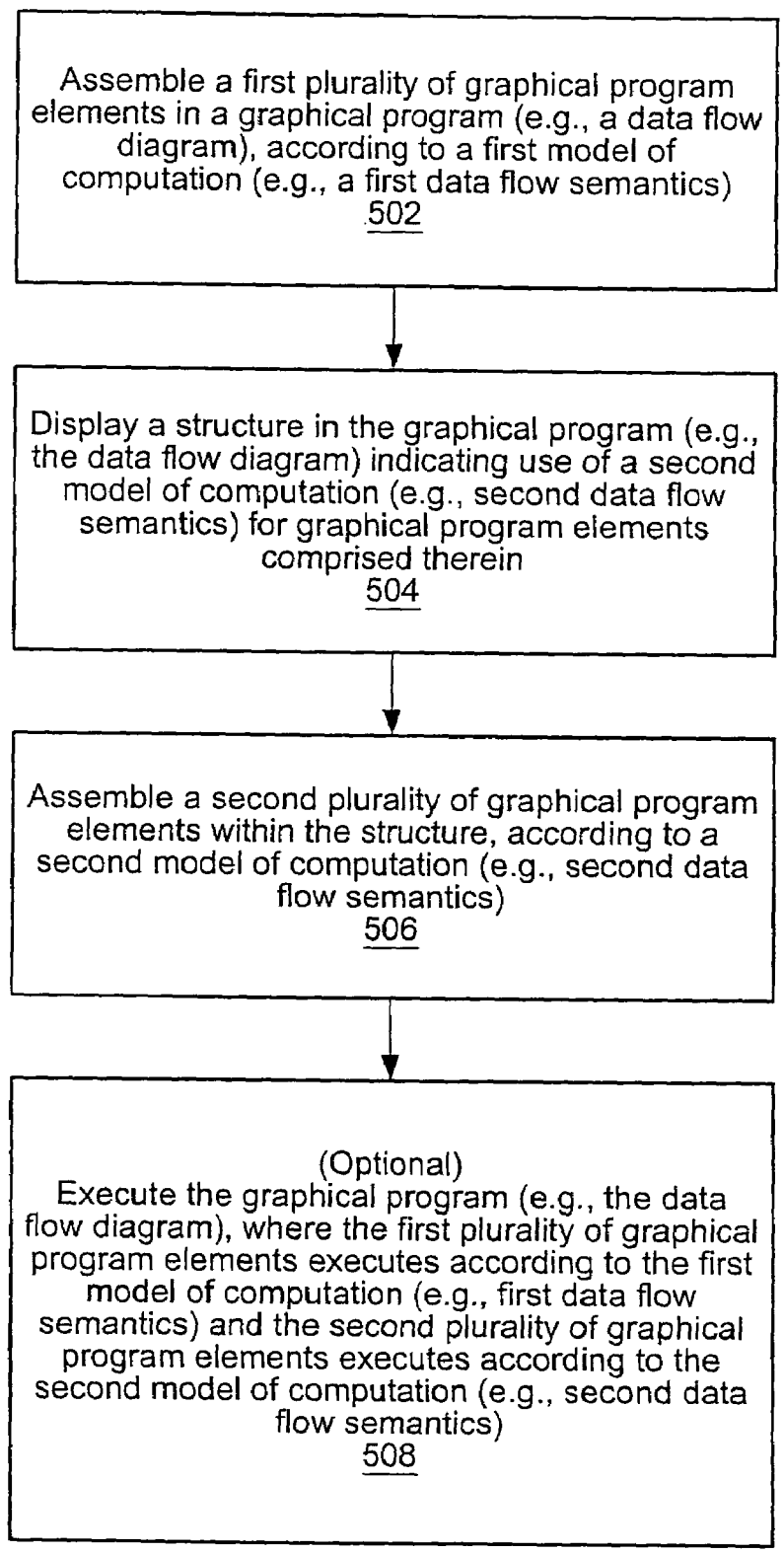
FIG. 5 is a flowchart diagram illustrating one embodiment of a method for creating a graphical program that includes multiple models of computation.

FIG. 5—Flowchart of a Method for Creating a Graphical Program

FIG. 5 illustrates one embodiment of a method for creating a graphical program that uses multiple models of computation, e.g., a data flow diagram with multiple data flow semantics. Note that while the term "model of computation" is more general than "data flow semantic", in a data flow application, i.e., where the graphical program is a data flow diagram that only implements or represents data flow as opposed to also including other models of computation, such as state diagrams, control flow, etc., the terms may be used synonymously. While the method of FIG. 5 is described in terms of a data flow diagram with multiple data flow semantics, it should be noted that the method also generalizes to multiple models of computation included in a single graphical program, the data flow embodiment described being but an example of the more general approach.

The method shown in FIG. 5 may be used in conjunction with any of the computer systems or devices shown in the above Figures, among other devices. In various embodiments, some of the step shown may be performed concurrently, in a different order than shown, or may be omitted. Additional steps may also be performed as desired. As shown, this method may operate as follows.

In 502, a first plurality of graphical program elements may be assembled in a data flow diagram, e.g., a graphical program, in response to first input, where the assembled first plurality of graphical program elements have first data flow semantics. In other words, the assembled first plurality of graphical program elements may comprise a first portion of the data flow diagram in accordance with first data flow semantics. For example, the user may arrange on a display a plurality of nodes or icons and then interconnect the nodes to create the data flow diagram. In response to the user assembling the data flow diagram, data structures may be created and stored which represent the data flow diagram. The data flow diagram may thus comprise a plurality of interconnected nodes or icons which visually indicates the functionality of the data flow diagram. Note that the data flow diagram may also be considered to be a graphical program, or a portion of a graphical program. As noted above, the data flow diagram (graphical program) may comprise a block diagram and may also include a user interface portion or front panel portion. Where the data flow diagram includes a user interface portion, the user may optionally assemble the user interface on the display. As one example, the user may use the LabVIEW graphical programming development environment to create the data flow diagram or graphical program.

In an alternate embodiment, the data flow diagram may be created by the user creating or specifying a prototype, followed by automatic or programmatic creation of the data flow diagram from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The diagram or program may be created in other manners, either by the user or programmatically, as desired.

In various embodiments, the first data flow semantics of the data flow diagram may be any of a wide variety of different data flow semantics. For example, in a preferred embodiment, the first data flow semantics may specify a homogenous model of computation, as used in LabVIEW data flow diagrams. Said another way, in one embodiment, the first data flow semantics may specify a single rate execution of graphical program elements, e.g., such that each graphical program element or node executes with the same frequency. In one embodiment, a graphical program that has a homogenous model of computation necessarily supports parallelism, e.g., a graphical data flow diagram where the diagram may support concurrent execution paths.

In another embodiment, the first data flow semantics may not include explicit feedback connections to implement looping. In other words, the first data flow semantics may specify iterative processing via an implicit feedback mechanism, such as enclosing the function nodes to be executed iteratively in a graphical loop structure, such as a LabVIEW while or for loop structure, rather than via direct or explicit feedback loops between outputs and inputs of nodes. Thus, in one embodiment, the first data flow semantics may comprise graphical structure nodes that specify looping, wherein the graphical structure nodes do not include explicit feedback connections to implement looping.

In one embodiment, the first data flow semantics may specify a single rate execution of graphical program elements, and may also not include explicit feedback connections to implement looping. In one embodiment, the first data flow semantics may comprise graphical structure nodes that specify conditional branching of operations. Note that in other embodiments, the nodes may be interconnected in control flow or execution flow formats, among other graphical programming formats.

In 504, a structure may be displayed in the data flow diagram, e.g., in response to second input, where the structure indicates use of second data flow semantics for graphical program elements comprised within the structure. In other words, a structure may be placed in the data flow diagram that serves to demarcate between the first plurality of graphical program elements and the second plurality of graphical program elements. For example, in one embodiment, the structure may comprise a loop structure that is operable to enclose, surround, or otherwise visually distinguish graphical program elements comprised in the structure, e.g., from the first plurality of graphical program elements of the data flow diagram. The structure preferably comprises an interior portion, wherein graphical program elements may be assembled and displayed within the interior portion. In a preferred embodiment, the loop structure may be a LabVIEW loop structure, e.g., a for loop or a while loop, as provided in the LabVIEW graphical programming system. Examples of the structure are described in more detail below.

In 506, a second plurality of graphical program elements may be assembled within the structure in response to third input. For example, in one embodiment the structure comprises a timed loop, and so the second plurality of graphical program elements may be placed inside the loop. The assembled second plurality of graphical program elements may comprise a second portion of the data flow diagram, in accordance with the second data flow semantics. As described above, and is well known to those skilled in the art of graphical programming techniques, in assembling the second plurality of graphical program elements in the structure, the user may interconnect the graphical program elements to specify and facilitate data flow between the elements, and may also connect a plurality of the graphical program elements with or to the structure.

In a preferred embodiment, the second data flow semantics specifies a different model of computation than the first data flow semantics, and thus the graphical program may represent a heterogeneous system, in that two different models of computation are included and supported in the graphical program. For example, in one embodiment, the second data flow semantics may support different syntax or formats, and/or a different rate of execution, from that of the first plurality of graphical program elements, e.g., control block notation, explicit feedback, etc., examples of which are described in more detail below. In another embodiment, the second data flow semantics may support multiple modes of execution among the graphical program elements (comprised in the structure), e.g., multiple rates of execution, and thus may use or support a heterogeneous model of computation. As noted above, the method of FIG. 5 is described in terms of data flow diagrams and data flow semantics, although this description is just one example of the more general case involving graphical programs and models of computation.

The resulting heterogeneous graphical program may be executable to perform a function, where the graphical program comprises a plurality of interconnected nodes that visually indicate functionality of the data flow diagram. As noted above, in one embodiment, the graphical program may comprise a data flow diagram. In a preferred embodiment, the data flow diagram may be operable to perform the function by executing the first portion of the data flow diagram in accordance with the first data flow semantics, and executing the second portion of the data flow diagram in accordance with the second data flow semantics. In other words, in one embodiment, the assembled graphical program elements of the data flow diagram may execute in accordance with their respective data flow semantics. Thus, the data flow diagram may represent or implement a heterogeneous system (i.e., supporting multiple data flow semantics or models of computation). It should be noted that although in the examples described herein only two different models of computation, e.g., data flow semantics, are utilized, in other embodiments, the number of different models of computation, e.g., data flow semantics supported concurrently in the data flow diagram, may be greater. Note also that in some embodiments, either or all of the two (or more) models of computation supported in the heterogeneous (multiple models of computation) graphical program may be homogenous (single rate) or heterogeneous (multi-rate). It should be further noted that in other embodiments, the graphical program may implement multiple models of computation that may or may not include data flow, but rather, may include any other models of computation as desired, including for example, state diagram, control flow, resource flow, SDF, and so forth.

Note also that the function may be any type of function desired. For example, in one embodiment, the data flow diagram may be operable to perform an industrial automation function, a process control function, and/or a test and measurement function, among others. Any other type of function may also be performed as desired, including, for example, functions related to analysis, e.g., data or image analysis, telecommunications, data or image processing, entertainment, science, medicine, and so forth.

Thus, the data flow diagram may optionally be executed to perform the function, as indicated in 508. In an embodiment where the data flow diagram includes a graphical user interface portion and a block diagram portion, during execution of the data flow diagram, the graphical user interface may be displayed on a display of a first computer system and the block diagram may execute on a second computer system. In another embodiment, at least a portion of the data flow diagram may be deployed to a programmable hardware element, e.g., an FPGA, and executed thereon. In other words, in one embodiment, at least a portion of the data flow diagram may be converted into a form suitable for deployment on a programmable hardware element. The converted at least a portion of the data flow diagram may be deployed onto the programmable hardware element, and the data flow diagram executed, where the converted at least a portion of the data flow diagram is executed on the programmable hardware element.

In one embodiment, executing the data flow diagram may include highlighting each graphical program element in the data flow diagram while the graphical program element is executing. In other words, during execution of the data flow diagram, each graphical program element may visually indicate when it is executing, e.g., by changing color, or otherwise changing its appearance.

In one embodiment, executing the second portion of the data flow diagram may include converting the second portion of the data flow diagram into graphical program code in accordance with the first data flow semantics, then executing the converted second portion, i.e., the resultant graphical program code, in accordance with the first data flow semantics. In one embodiment, the converted second portion may comprise a companion data flow diagram coupled to the first portion of the data flow diagram, where the companion data flow diagram executes in lieu of, or in conjunction with, the second portion of the data flow diagram. In one embodiment, the execution highlighting may be performed with respect to the first portion, the second portion, and/or the companion diagram. In a preferred embodiment, the companion diagram may be executed in lieu of the second portion of the data flow diagram, and any results or effects related to the companion diagram propagated back to the simulation diagram, e.g., for the user to view. Note that in different embodiments, the companion diagram may or may not be displayed to the user.

Figure 6:
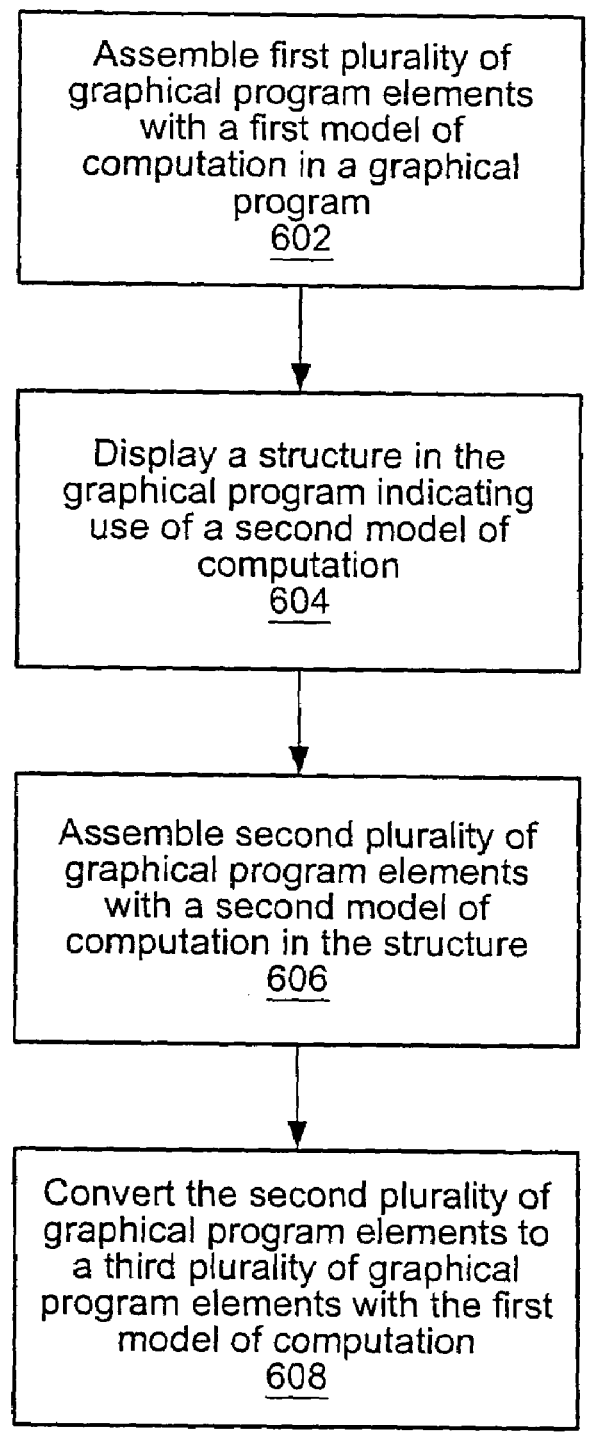
FIG. 6 is a flowchart diagram illustrating one embodiment of a method for converting a data flow diagram with a second model of computation to a data flow diagram with a first model of computation.

FIG. 6—Conversion from First Data Flow Semantics to Second Data Flow Semantics

FIG. 6 is a high level flowchart diagram of a method for creating and executing a graphical program, including a first portion with a first model of computation, e.g., a first data flow diagram having first data flow semantics, and a second portion with a second model of computation, e.g., a second data flow diagram having second data flow semantics. As noted above with reference to FIG. 5, while the method of FIG. 6 is described in terms of converting a second plurality of graphical program elements with second data flow semantics to a third plurality of graphical program elements with first data flow semantics, the method generalizes to conversion of a second plurality of graphical program elements with a second model of computation to a third plurality of graphical program elements with a first model of computation. In other words, the data flow embodiment described is but an example of the more general approach where a graphical program portion implementing a second model of computation is converted to a graphical program portion implementing a first model of computation. Similarly, the techniques described herein may also be used to convert a second graphical program or data flow diagram with a second model of computation to a first graphical program or data flow diagram with a first model of computation.

In various embodiments, some of the steps described may be performed concurrently, in a different order than shown, or omitted. Additional steps may also be performed as desired.

As FIG. 6 shows, in 602, a first plurality of graphical program elements may be assembled in a graphical program in response to first input, where the assembled first plurality of graphical program elements are in accordance with a first data flow semantics, or, more generally, have a first model of computation. In a preferred embodiment, the first model of computation specifies a homogenous data flow model of computation, such as the "G" graphical programming language provided by National Instruments Corporation.

In 604, a structure may be displayed in the graphical program, where the structure comprises an interior portion, and where the structure indicates use of a second data flow semantics (or model of computation) for graphical program elements comprised within the interior portion of the structure.

In 606, a second plurality of graphical program elements may be assembled within the interior portion of the structure in response to second input, wherein the assembled second plurality of graphical program elements included within the interior portion of the structure are in accordance with the second data flow semantics (or the second model of computation).

In 608, the assembled second plurality of graphical program elements may be converted into a new third plurality of graphical program elements in accordance with the first data flow semantics (or the first model of computation).

Figure 7A:
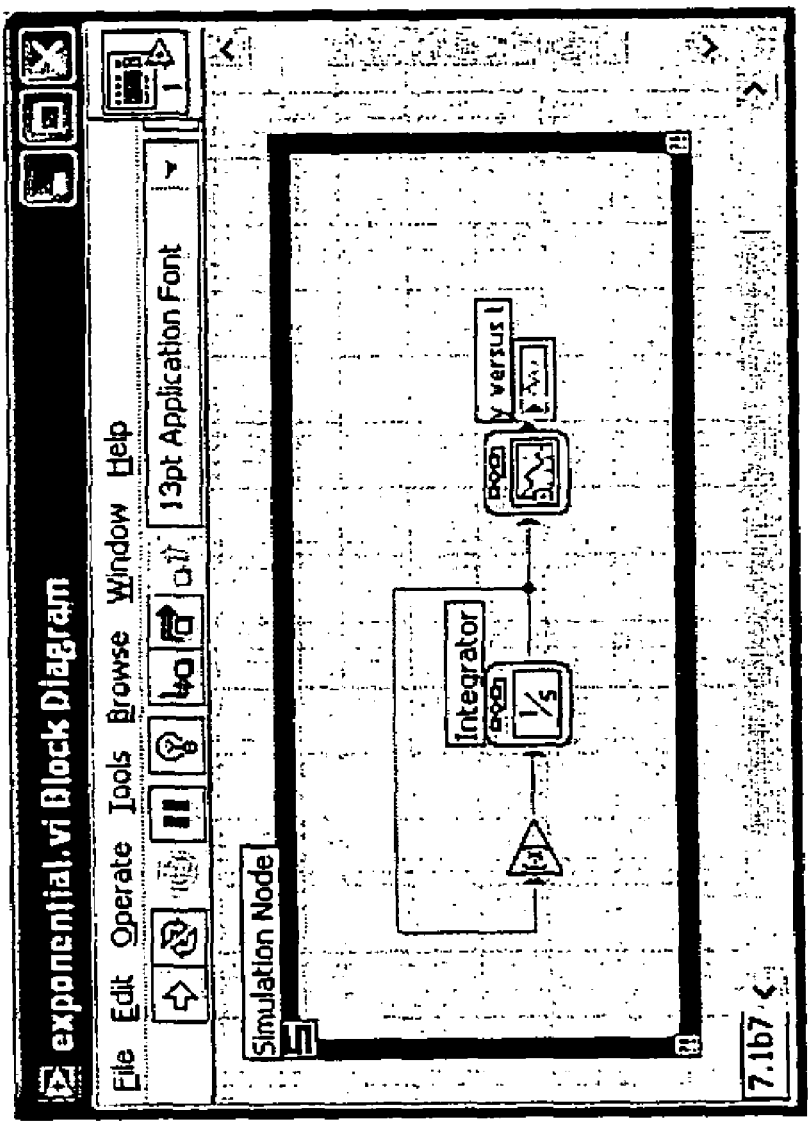
FIGS. 7A and 7B respectively illustrate a data flow diagram prior to and after the conversion of FIG. 6, according to one embodiment.

FIG. 7A illustrates an exemplary embodiment of an example data flow diagram that uses second data flow semantics, in this case, a simulation diagram or simulation node. For example, in the embodiment shown, a user has presumably created the simulation diagram by dragging and dropping selected simulation nodes or primitives onto a block diagram, or by any other means available. Note that this example simulation node or diagram includes an iterative portion, i.e., a "negatizer" and an integrator, which execute at a first rate, and a graphing node that executes at a second, different, rate. Thus, the simulation diagram is a heterogeneous data flow diagram. An exemplary conversion of this diagram (i.e., a converted graphical program) is described below with reference to FIG. 7B.

Thus, during compilation, the assembled second plurality of graphical program elements (which operate in accordance with the second data flow semantics) may be converted or translated to (assembled) graphical program elements that operate in accordance with the first data flow semantics, thereby producing the third plurality of graphical program elements. Thus, the first data flow semantics (or model of computation) may be considered a "basis" data flow semantics or model of computation, in that it may serve as an implementation layer for the second data flow semantics or model of computation.

As mentioned above, in one embodiment, the first data flow semantics specifies a homogenous model of computation. For example, the first data flow semantics may specify a single rate execution of graphical program elements. In other words, each of the graphical program elements in the first plurality of graphical program elements preferably has the same rate of execution, e.g., each element may execute the same number of times per execution of the graphical program, i.e., each element may produce and consume the same number of tokens per execution.

In one embodiment, the first data flow semantics does not include explicit feedback connections to implement looping. In other words, the first data flow semantics may not implement iterative execution via direct feedback from a node's (or a group of nodes') output to the node's (or the group of nodes') input. In another embodiment, the first data flow semantics may specify a single rate execution of graphical program elements, and may also not include explicit feedback connections to implement looping.

In one embodiment, the first data flow semantics may include graphical structure nodes that specify looping, where the graphical structure nodes do not include explicit feedback connections to implement looping. Similarly, the first data flow semantics may include graphical structure nodes that specify conditional branching of operations. One example of a graphical programming system with the above features (e.g., with the first data flow semantics) is the LabVIEW graphical programming system.

In one embodiment, the second plurality of graphical program elements may be converted to the third plurality of graphical program elements in the following manner:

First, the second plurality of graphical program elements may be parsed to determine a plurality of primitives, where the plurality of primitives operate according to the second data flow semantics.

The third plurality of graphical program elements may then be determined based on the plurality of primitives, where the third plurality of graphical program elements operate according to the first data flow semantics. Then, the determined third plurality of graphical program elements may be assembled in accordance with the first data flow semantics.

In one embodiment, assembling the determined third plurality of graphical program elements may include interconnecting the third plurality of graphical program elements according to an execution partial order based on a topological analysis of the second plurality of graphical program elements and/or the graphical program (e.g., including the first plurality of graphical program elements). In other words, the data flow dependencies among the graphical program elements of one or both of the first and second pluralities of graphical program elements may be analyzed to determine the appropriate connections to make among the elements of the third plurality of graphical program elements.

In another embodiment, assembling the determined third plurality of graphical program elements may include enclosing the determined third plurality of graphical program elements in a first loop structure in accordance with the first data flow semantics. For example, as described above, the determined third plurality of graphical program elements may be enclosed within a loop structure, such as a while or for loop structure, where the loop structure may facilitate or implement iterative execution of the enclosed graphical program elements.

In some embodiments, the graphical program may be compiled. For example, in one embodiment, compiling the graphical program may include the converting described above. The compiling and/or converting may be performed in response to user input, or may be performed automatically. For example, user input may be received, e.g., selecting a menu item or activating a control, invoking the conversion (and/or compilation), where the converting (and/or compiling) is performed in response to the user input. In some embodiments, the converting and/or compiling may be performed in response to another action. For example, when the user saves the program, the conversion and/or compilation may be performed automatically. Alternatively, the conversion and/or compilation may occur automatically when the user invokes execution of the program. In further embodiments, the converting may be performed separate from the compiling, e.g., prior to compiling the program, and may be performed automatically, or in response to user input.

In one embodiment, the conversion may be dependent upon the target platform for the program. In other words, a target platform for the program may be specified, e.g., by the user, and the second plurality of graphical program elements may be converted to the third plurality of graphical program elements based on the specified target platform. For example, if the target platform specified were a programmable hardware element, such as an FPGA, some or all of the third graphical program elements may be created or selected specifically for deployment on the FPGA. Thus, at least a subset of the third plurality of graphical program elements may be specific to the specified target platform.

Figure 7B:
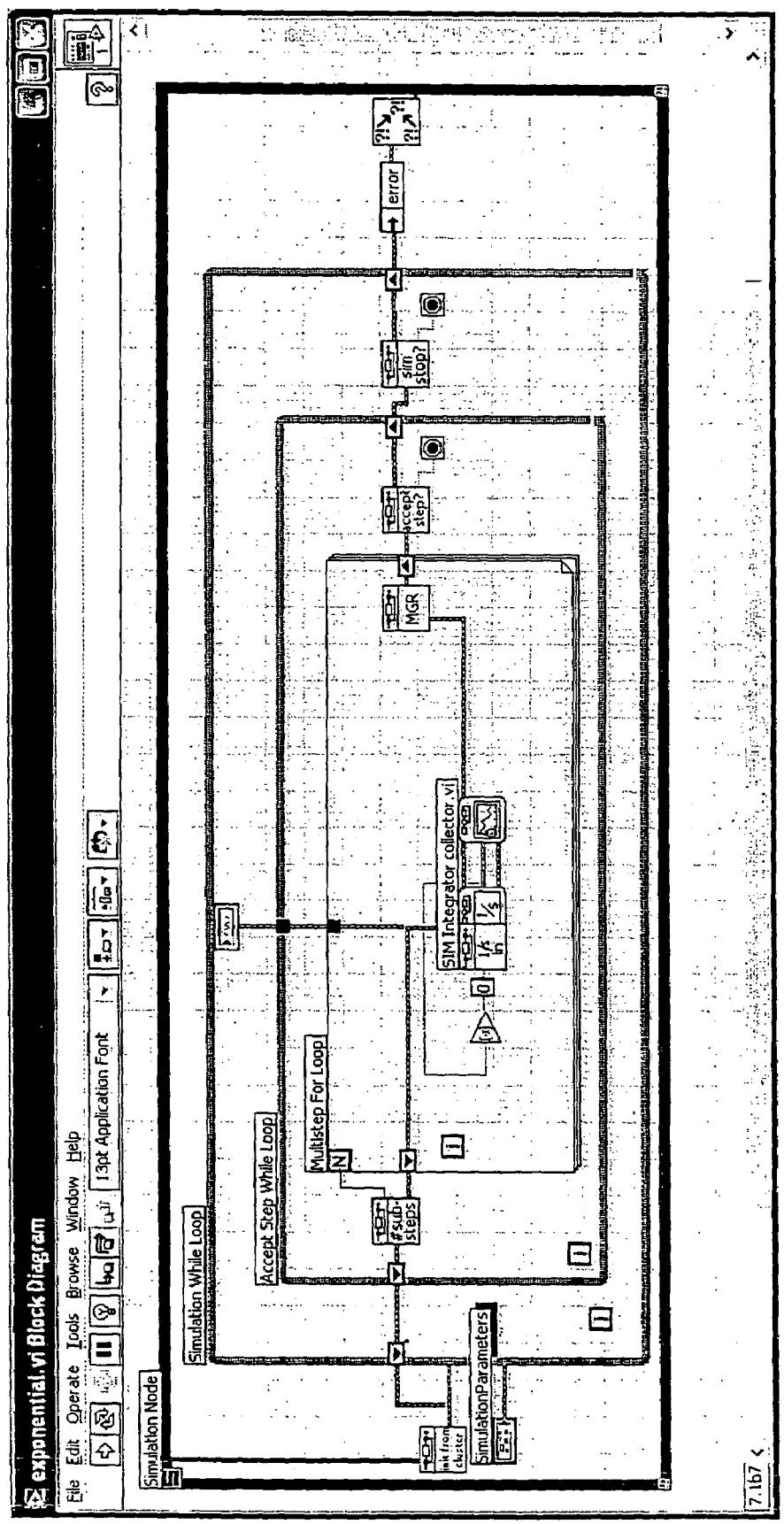

FIG. 7B illustrates an exemplary data flow diagram (graphical program) that results from conversion of the simulation diagram or node (or graphical program) of FIG. 7A to a data flow diagram in accordance with the first data flow semantics, e.g., a homogenous model of computation, according to one embodiment. As FIG. 7B shows, additional graphical program elements, including nested while loops, have been included to implement the multi-rate aspects of the simulation diagram/node. Thus, while the data flow diagram of FIG. 7B executes strictly in accordance with the first data flow semantics, e.g., a homogenous model of computation, it actually implements the simulation diagram or node of FIG. 7A, and thereby implements the second data flow semantics, but at a higher level. In other words, the first data flow semantics (or model of computation) serves as a basis (e.g., a basis model of computation) that may be used to implement the second data flow semantics (or model of computation).

Thus, the second plurality of graphical program elements may be converted to the third plurality of graphical program elements. In other words, the assembled third graphical program elements (in accordance with the first data flow semantics) may be determined based on the assembled second graphical program elements (in accordance with the second data flow semantics). It should be noted that in other embodiments, the second data flow semantics or model of computation may be used as the basis, and the portion of the graphical program that uses the first data flow semantics or model of computation may be converted to the second data flow semantics or model of computation. Thus, the graphical program may include a first portion comprising the first plurality of graphical program elements, and a second portion comprising the second plurality of graphical program elements, where the second portion may be converted to generate the third plurality of graphical program elements.

Alternatively, in yet another embodiment, a third data flow semantics or model of computation may be used as the basis, and both the first portion and the second portion may be converted to the third data flow semantics or model of computation. As mentioned above, this approach may be extended to any number of data flow semantics or models of computation, as desired.

Further details of the conversion process for different second data flow semantics (or more generally, for different models of computation) are described below in detail.

In a preferred embodiment, the graphical program comprises a first portion and a second portion, where the second portion is in accordance with the second data flow semantics, and where the first portion is in accordance with the first data flow semantics. In other words, the graphical program may comprise a heterogeneous graphical program that includes portions in accordance with the first and second data flow semantics, respectively, such as the graphical program or data flow diagram described above with reference to the method of FIG. 5. Thus, the conversion process described above may be performed on only that portion of the graphical program that has the second data flow semantics.

The graphical program preferably comprises a plurality of interconnected nodes that visually indicate functionality of the graphical program. In one embodiment, the graphical program comprises a block diagram portion and a user interface portion, as described above with respect to graphical programs. In one embodiment, during execution of the graphical program, the graphical user interface is displayed on a display of a first computer system and the block diagram executes on a second computer system.

The graphical program may operate to perform any type of function desired. For example, the graphical program may be operable to perform one or more of: an industrial automation function, a process control function, and a test and measurement function, among others. The methods described herein may thus include executing the graphical program to perform a function. As also described above, in one embodiment, executing the graphical program may include highlighting each graphical program element in the graphical program while the graphical program element is executing.

As described above, in one embodiment, the third plurality of graphical program elements may comprise a companion diagram in accordance with the first data flow semantics and may correspond to the second portion of the graphical program, i.e., the second plurality of graphical program elements. Thus, executing the second portion of the graphical program may comprise executing the companion diagram. Note that, as also mentioned above, in one embodiment, the companion diagram may be executed in lieu of the second portion of the graphical program. However, from the user's perspective, it may appear that the second portion of the data flow diagram is executing. For example, the companion diagram may not be displayed to the user, but may execute in the background, providing results of the companion diagram execution to the graphical program such that the second portion appears to the user to be executing.

In another embodiment, the companion diagram may be displayed, e.g., along with the second portion of the graphical program. For example, in an embodiment where execution highlighting is supported, as the graphical program elements in the companion diagram execute, not only may those elements be highlighted, but the corresponding graphical program elements in the second portion of the graphical program may be highlighted as well.

In one embodiment, at least a portion of the graphical program may be converted into a form suitable for deployment on a programmable hardware element. The converted at least a portion of the graphical program may then be deployed onto the programmable hardware element. The graphical program may then be executed, including executing the converted at least a portion of the graphical program on the programmable hardware element. Note that the descriptions herein of the first, second, and graphical programs also applies to the more general case of first, second, and third graphical programs, with first and second models of computation.

Describing the above in a slightly different way, and in terms of the more general method, creating a first graphical program having a first model of computation based on a second graphical program having a second model of computation may include storing the second graphical program, where the second graphical program includes a first portion having first model of computation, comprising a first plurality of graphical program elements, and a second portion having second model of computation, comprising a second plurality of graphical program elements enclosed in a loop structure, also in accordance with the second model of computation. The second portion of the second graphical program may be converted into a third graphical program having first model of computation, where the third graphical program is coupled to the first portion of the second graphical program, where the first portion of the second graphical program and the third graphical program comprise the first graphical program.

Examples of Data Flow Diagrams with Multiple Data Flow Semantics

As noted above, there is a wide variety of different models of computation, e.g., data flow semantics, that may be used in graphical programming. In the examples below, the first model of computation is assumed to be that of the LabVIEW graphical programming system, i.e., the homogenous dynamic model of computation utilized by the G programming language provided by National Instruments. It should be noted, however, that this is but one exemplary case, and that any other models of computation may be used as desired. Similarly, the example second models of computation described below are also meant to be exemplary only, and are not intended to limit the second models of computation to any particular type. For example, in other embodiments, the second model of computation may comprise data flow semantics, and may include cyclostatic data flow, parameterized data flow, or other types of data flow semantics. Other examples of diagrams contemplated for inclusion or conversion include Bondi graphs, resource flow diagrams, control block diagrams, state machines, resource flow, and control flow diagrams, among others.

Example: Simulation Diagram

One area of application for graphical programming that benefits substantially from non-homogenous models of computation or data flow semantics is simulation, which as noted above, is used increasingly in test, design, and control applications. In simulations implemented with graphical programs, graphical program elements often represent respective components and/or sub-processes of a system or process. The graphical program elements, also referred to as nodes, may require or at least substantially benefit from features or behaviors not supported by some graphical programming systems. For example, as noted above, the standard LabVIEW development environment (including the G graphical programming language) does not support multiple rates of execution among the program nodes, having a homogenous model of computation.

However, in many simulations, different components or processes may have different frequencies of operation, and so the nodes representing these components or processes may need to fire or execute at different rates. In some applications, both models of computation may be needed, such as, for example, in a control application that includes a simulation of the process or system being controlled. In this example, a homogenous dynamic model of computation (or data flow semantics, such as with G graphical program code) may be used to implement control functionality, while a heterogeneous or multi-rate model (such as with simulation nodes) may be used to implement the simulation portion of the application.

As noted above, in one embodiment, the second model of computation may comprise second data flow semantics that support a multi-rate execution of graphical program elements, and may further include explicit feedback connections to implement looping. In one embodiment, the second plurality of graphical program elements may comprise a control block diagram utilizing control block notation, as is well known in the art of graphical programming.

In one embodiment, the second plurality of graphical program elements may comprise a simulation diagram, where at least a subset of the second plurality of graphical program elements comprise simulation nodes, and where the simulation diagram implements a simulation.

For example, in one embodiment, the simulation diagram may allow a LabVIEW user to embed "control block diagram" notation directly into a LabVIEW graphical program or data flow diagram. The simulation diagram may graphically depict a relationship between outputs and inputs of graphical program elements that are evaluated at each timestep of the simulation. Thus each complete evaluation of the simulation diagram preferably corresponds to one time step. Since the simulation diagram has different data flow semantics or rules than a LabVIEW diagram, the simulation diagram may be given a distinctly different look, e.g. a "watermark" background, to further distinguish from standard LabVIEW diagrams.

The simulation diagram may utilize a set of semantics and execution properties that differ from an ordinary LabVIEW data flow diagram. In one embodiment, key differences between simulation diagrams and LabVIEW diagrams may include one or more of the following:

1. Feed-through information—A node in a simulation diagram may require only a subset of its inputs in order to compute any given output. The set of inputs required to compute a given output are said to feed that output directly, or to have "direct feed-through" to the output. Inputs not required to compute the output have "indirect feed-through". Said another way, direct feed-through refers to a property of a graphical program element where all of the inputs to the graphical program element must be present or valid for the graphical program element to fire or execute, whether or not each of the outputs for the graphical program element requires all of the inputs. In contrast, indirect feed-through refers to a property where the graphical program element generates an output as soon as the inputs needed for that output are present.

The semantics for the simulation diagram may specify that a node must fire any given output as soon as it has received the inputs that have direct feed-through to the output. (Note that this is a key difference from the LabVIEW diagram, which specifies that all inputs must be received before any output may be fired) Thus, it may be necessary for the simulation diagram to have access to feed-through information for each node. Although existing node types in LabVIEW may retain their existing behavior when placed in a simulation diagram (i.e. that all inputs have direct feed-through to all outputs), the simulation diagram may preferably recognize various simulation primitives and simulation subsystems that may have indirect feed-through from inputs to outputs.

Thus, in one embodiment, the simulation nodes may support direct feed-through and indirect feed-through for inputs and outputs of the simulation nodes. In other words, in one embodiment, at least one of the simulation nodes may comprise a plurality of inputs and a plurality of outputs, where a first output of the plurality of outputs requires only a subset of the plurality of inputs, and where the least one of the simulation nodes is operable to fire upon reception of the subset of the plurality of inputs to generate the first output.

In one embodiment, a feed-through mapping of inputs to outputs for the simulation nodes may be computed and stored. The computed feed-through mapping may be useful in converting graphical code with one data flow semantics to graphical code with another data flow semantics, described in detail below.

2. Feedback cycles—Cycles may be allowed between outputs and inputs of a node in the simulation diagram that do not feed directly to each other. Thus, in one embodiment, at least one of the simulation nodes may support a feedback cycle between an output of the simulation node and an input of the simulation node, e.g., an explicit feedback loop. For example, in one embodiment, at least one simulation node of the simulation nodes may support a feedback cycle between an output of the simulation node and an input of the simulation node if the input of the simulation node has indirect feed-through to the output of the simulation node, and/or if the input of the simulation node corresponds to a different iteration than the output of the simulation node. In other words, in this embodiment, an explicit feedback loop from the output to the input of the node may be supported as long as the input is not directly required by the output, and/or as long as the input and the output are not for the same iteration.

3. Multiple executions of nodes—Depending upon the solver specified for a simulation diagram, each node instance on the diagram may in fact be executed more than once for each execution of the diagram. In other words, in one embodiment, at least one of the simulation nodes may execute two or more times per execution of the simulation diagram. Thus, as noted above, the simulation diagram may support multi-rate execution among the simulation nodes. In one embodiment, in order to ensure that a node instance is executed only once per diagram execution, users may specify "lock and hold" behavior for that node. Note, however, that some nodes, such as DAQ I/O, may default to this behavior.

4. Placement of Simulation diagrams—In one embodiment, simulation diagrams may exist only as a root-level diagram of a simulation loop or a simulation subsystem (both described below).

In one embodiment, one or more simulation parameters for the simulation diagram may be configured and stored, where the configured one or more simulation parameters specify operation of the simulation diagram. In other words, the one or more simulation parameters may determine the behavior of the simulation diagram subject to constraints imposed by the second data flow semantics.

In one embodiment, one or more of the simulation nodes may comprise simulation primitives, i.e., simulation nodes that do not represent a sub-simulation diagram. Simulation primitives may preferably only be placed in a simulation diagram, and may have indirect feed-through properties as mentioned above. Key differences between simulation primitives and standard LabVIEW primitives may include:

1. Diagram placement—Simulation primitives may only be placed in a simulation diagram, while LabVIEW primitives may be used in standard LabVIEW block diagrams, and in some cases may be used in a simulation diagram.

2. Execution—A simulation primitive node may execute and outputs can fire before all inputs are received.

3. Cycles—Cycles may be allowed between non-direct feed-through terminals on a simulation primitive.

Note that in control block diagrams, the graphical program elements or nodes may be referred to as "blocks". In one embodiment, the simulation primitives may comprise a diverse control block diagram blockset, and may incorporate a number of features that are beyond the capabilities of standard LabVIEW subVIs. For example, some simulation blocks (e.g., an integrator block) may have inputs that do not directly feed outputs. Examples of blocks include integrators, transfer functions, look-up tables, and gain blocks, among others.

Some of the extended abilities that may be supported by simulation primitives may include one or more of configuration pages, dynamic icons, growing icons, N-ary operations, numeric polymorphism (e.g., both in terms of data type and/or dimensionality), custom pop-up menu commands, reversed block orientation, and terminal feed-through mappings, among others.

Although simulation primitives are generally "atomic", in that they do not represent a sub-simulation diagram, objects that access hidden simulation data may also be considered fundamental objects, and may be treated specially. For example, these objects may appear to the user as "primitives", and users may not be able to view the implementation directly from the simulation diagram, although in some embodiments, for advanced users the scripted (programmatically generated) code behind the objects may be made viewable.

Simulation primitives preferably map directly to a block or node in the companion diagram, and so in one embodiment, the amount of feed-through on any given input may be implemented via a shift register buffering that input. Importantly, this may restrict feed-through on simulation primitives to a simple on/off choice, i.e., either an input directly feeds all of the outputs, or it feeds none of them. Any block or node whose feed-through profile is more complicated may be implemented as a simulation subsystem rather than a primitive. Further information regarding simulation subsystems is provided below.

Note that since simulation primitives need to access simulation data available only in a simulation diagram, they preferably may not be dropped onto a regular LabVIEW diagram, and so may be visually distinguishable from regular LabVIEW elements, e.g., via color, shape, label, etc.

In one embodiment, the simulation primitives may be based on LabVIEW external nodes. The external node is a LabVIEW node for which run-time and edit-time behavior is defined using G code. Edit-time behaviors such as node appearance/size, pop-up menus, double-click actions, and terminal type specifications may be specified for each node. In addition, the run-time behavior of the node may be specified, e.g., using VI scripting for code generation. By leveraging the features of the external node, the extended functionality may be implemented primarily in G. For further information regarding external nodes, please see U.S. patent application Ser. No. 10/094,198 titled "Self-Determining Behavior Node For Use In Creating A Graphical Program", filed Mar. 8, 2002, which was incorporated by reference above.

FIGS. 8-15B—Simulation Nodes

In one embodiment, a generic simulation node may be used as a template for simulation nodes. In other words, the simulation nodes may inherit their basic functionality from the generic simulation node. The interface of the governing program may be fixed across nodes, such that any simulation node may be defined purely in terms of its methods or functions and its block state. Thus, each derived node may comprise a governing program as well as a set of methods or functions and a block state control, e.g., in an .llb file, as described above. In one embodiment, a scripting based tool may be provided for "deriving" a node from another node.

FIG. 8—Palettes

Figure 8:
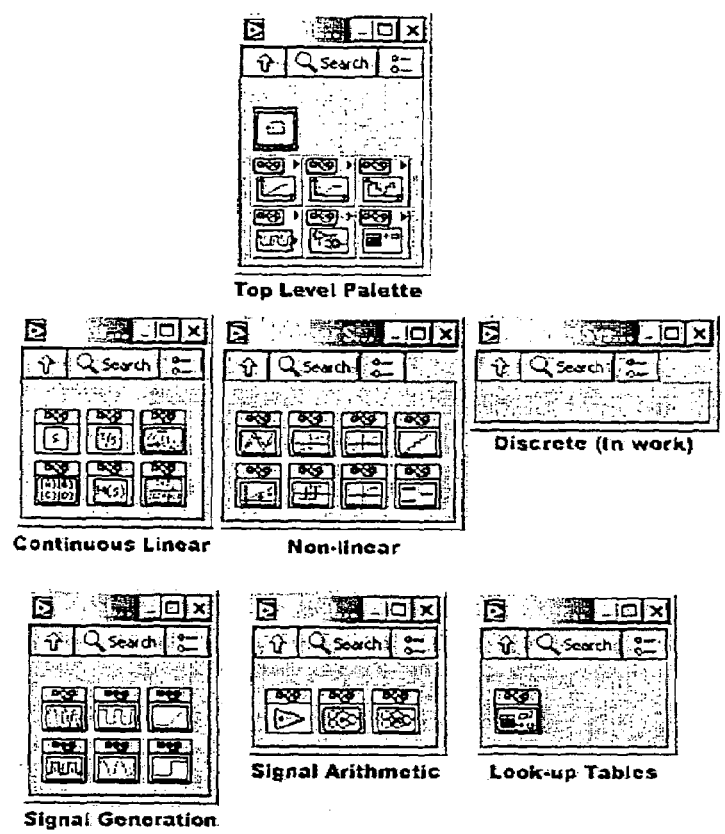
FIG. 8 illustrates a palette of simulation primitives, according to one embodiment.

In one embodiment, simulation primitives may be presented to the user (e.g., for selection) in a palette, e.g., in a simulation primitives palette. For example, in one embodiment, the simulation primitives palette may be a hierarchical palette, where one or more of the elements in the palette represent further palettes (e.g., sub-palettes), and so forth, such as illustrated in FIG. 8. Note that the palettes shown in FIG. 8 are meant to be exemplary only, and are not intended to limit the palettes or elements to any particular appearance or functionality.

As FIG. 8 shows, a top level palette may include a plurality of elements or icons selectable by the user, e.g., in the case of a simulation primitive, for inclusion in a simulation diagram, or, in the case of a sub-palette icon, for invoking display of a corresponding sub-palette. In the embodiment of FIG. 8, the top-left icon in the top level palette represents a simulation loop structure that may be selected and "dragged and dropped" onto a data flow diagram (i.e., a graphical program, such as a LabVIEW block diagram) to indicate (e.g., by enclosing) use of second data flow semantics for graphical program elements comprised within the structure, as described above with reference to FIG. 5.

The remaining icons shown in the top level palette represent respective sub-palettes of simulation nodes, e.g., simulation primitives, which may be selected by the user for inclusion within the simulation loop structure. For example, as FIG. 8 indicates, sub-palettes may be provides for continuous linear simulation nodes (i.e., blocks), non-linear simulation nodes, discrete simulation nodes, signal generation simulation nodes, signal arithmetic simulation nodes, and loop-up tables, among others. Thus, the various simulation nodes or blocks displayed in the simulation palettes may be included within the simulation loop structure in the data flow diagram to implement a control block diagram or simulation diagram within the data flow diagram, where, as described above, the simulation diagram operates according to the second data flow semantics.

In a preferred embodiment, the simulation nodes may appear as primitives to the user, and may operate according to the second data flow semantics. However, graphical program elements in the companion diagram that correspond to the simulation nodes may implement this behavior (e.g., the second data flow semantics) using the first data flow semantics. For example, inputs of a node in the companion diagram that do not directly feed the outputs of the node may be "buffered" by a shift register, e.g., the input signal may be sent to a right shift register, and the corresponding left shift register may actually feed the input on the node. In this way, from the viewpoint of the user, the simulation node may be allowed to fire even if the input signal has not yet fired. As another example, many of the simulation nodes or blocks may expose special simulation data terminals which may be displayed only on the companion diagram and wired to during the scripting process, described in more detail below. Thus, additional graphical program elements or structures may be included in the companion diagram to facilitate the correct behavior (as perceived by the user) in the simulation diagram.

As noted above, in one embodiment, a generic simulation node framework may be implemented based on the external node described in U.S. patent application Ser. No. 10/094, 198, incorporated by reference above. This framework may comprise a top-level governing program and a set of functions that implement the edit time behaviors of the node (e.g., in an .llb file). In other words, additional program code may be provided to ensure that simulation nodes operate in accordance with the second data flow semantics. The framework may also include a control, e.g., a BlockState control, which may maintain information about the current state of the node as well as a global variable containing the node's default initial block state. The following is a list of exemplary behaviors that may be implemented in or by the functions:

Init—When the node is first dropped, set the node's block state to a default value and allocate any resources that might be needed.

Draw—Draw the node's icon and determine its bounds

TermSpec—Generate a terminal specification for the node

SetMenu—Generate a list of bdpopup menu items that will be available when the node is right-clicked DoMenu—Change the node's block state based on a selection of one of the node's bdpopup commands ConfigPage—Display a configuration page that will allow user to modify parameters of the node and update the node's state accordingly PropType—Update the node's state based upon the types wired to its terminals Feed-through—Given a term index, return a list of terminals that this term directly feeds Grow—Update the nodes block state based on a grow event Color—Update the nodes block state based on a "color" tool click GetColor—Return a color based on an "eyedropper" click It should be noted that the above behaviors or methods are exemplary only, and are not intended to limit the methods or functionality of the simulation nodes to any particular set of functions.

BlockState Inheritance

In one embodiment, any derived node (e.g., VI) may use a block state that is a superset of the block state of its parent node. The contents of the block state may contain one variant attribute per class in the node's inheritance chain with each attribute matching the private member data associated with one particular class.

Method Inheritance

In one embodiment, a derived node may either directly call into its parent node's functions, or it may override behaviors with its own implementations. The overridden functions may in turn call back into the parent functions as well as perform some additional work. This may be necessary in any case where a child node extends the behavior of a parent rather than overriding it.

Figure 9:
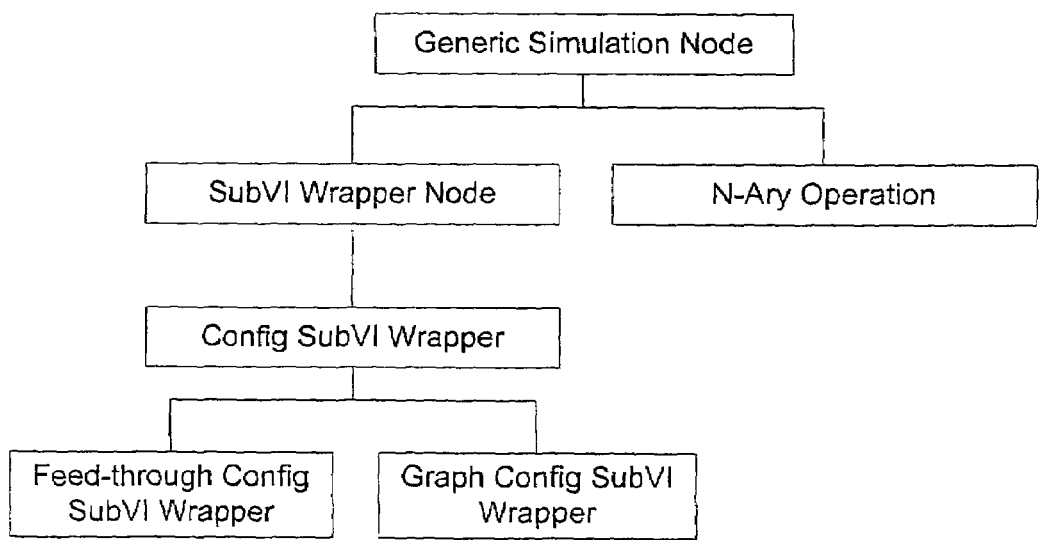
FIG. 9 illustrates an inheritance hierarchy for simulation node classes, according to one embodiment.

In one embodiment, the simulation nodes may be conceptually equivalent to fixed-interface classes whose member variables are encapsulated by the BlockState and whose member methods are specified by function calls that are either specific to the node or inherited from a parent. Inherited methods may make super calls to extend the parent method rather than overriding it. Using this concept of inheritance, a hierarchy of classes of nodes may be created from which simulation primitives may be derived. FIG. 9 is a diagram of one embodiment of an inheritance hierarchy for simulation node classes. Note that the diagram of FIG. 9 is meant to be exemplary only, and is not intended to limit the inheritance hierarchy to any particular structure or set of classes.

As FIG. 9 shows, the root simulation node class is the generic simulation node, described above and labeled "Generic Simulation Node". In this embodiment, the generic simulation node is a node whose basic purpose is to provide the fundamental interface and BlockState that may be used by derived simulation nodes, and may contain base implementations for every simulation node method or function. In one embodiment, the generic simulation node may also store a fundamental block state that may be used by every derived simulation node.

Figure 10:
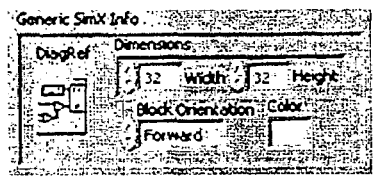
FIG. 10 illustrates an information dialog for the generic simulation node block state, according to one embodiment.

In one embodiment, the generic simulation component of the block state may contain a reference to the simulation diagram (and possibly the associated companion diagram) to which the node belongs, the dimensions of the block, its orientation, and a color. In one embodiment, the generic simulation component of the block state may include additional information, such as, for example, version information, a block name, and/or class hierarchy table, etc. FIG. 10 illustrates one embodiment of an information dialog for the generic simulation node block state. As FIG. 10 shows, fields may be provided for specifying the node or block size, orientation, and color, among others.

Figure 11:
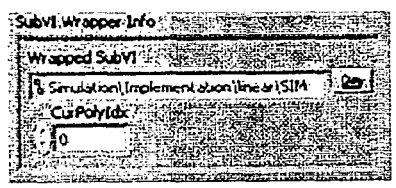
FIG. 11 illustrates an information dialog for a subVI wrapper node, according to one embodiment.

FIG. 11—SubVI Wrapper Node

Referring back to FIG. 9, in this exemplary embodiment of the class hierarchy, a subVI wrapper node class may be derived from the generic simulation node. Note that as used herein, the term "subVI" refers to a graphical program element or node that may itself represent a plurality of other graphical program elements, e.g., a sub-diagram. In one embodiment, the subVI wrapper node is a node whose core functionality may be implemented purely in terms of a subVI (possibly polymorphic). The subVI may then be wrapped by a simulation node in order to provide extended user interface (UI) capabilities, such as configuration pages, dynamic icons, etc.

In one embodiment, these nodes may store a path to the wrapped subVI in their block state as well as an index of the current polymorphic instance, if applicable. The nodes may include a code generation method that may script a call to the subVI, as well as a property types method that may attempt to find a polymorphic match to adapt to when applicable. The nodes may harvest information from various properties, such as conpane (a configuration pane or panel), icon, and VI properties, as needed to generate term specifications, a base icon, etc. FIG. 11 illustrates an information dialog for the subVI wrapper node, where the dialog includes fields for the path to the wrapped subVI, as well as the index of the current polymorphic instance.

Figure 12:
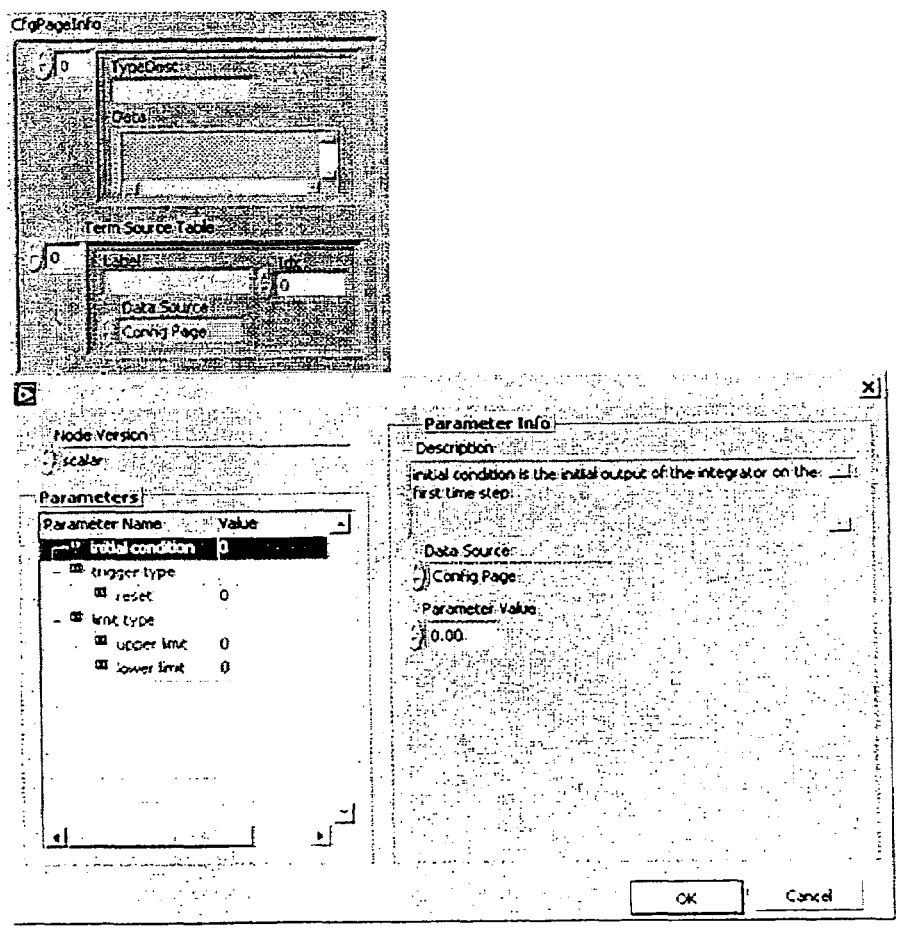
FIG. 12 illustrates one embodiment of a configuration page information dialog and a configuration page for an integrator block or node.

FIG. 12—Config SubVI Wrapper Node

In one embodiment, a configuration subVI wrapper node class may be provided that extends the subVI wrapper node class with a configuration page that is generated "on-the-fly" based on the parameters of the wrapped subVI. FIG. 12 illustrates one embodiment of a configuration page information dialog and a configuration page, in this case for an integrator block or node. As FIG. 12 shows, in this embodiment, the configuration page information dialog may include fields for specifying a type description and a terminal source table, including label, index, and data source.

In one embodiment, the configuration page may be an event based dialog that displays a list of parameters in a tree control. Once a parameter is selected, a corresponding control may be harvested from the subVI and inserted into a VI running in a sub-panel on the configuration page. The user may then set the value of the parameter through a sub-panel control as well as choose the source of the parameter (e.g., a terminal or configuration page).

In this embodiment, the initial source of a parameter may be determined by the required/recommended/optional state of the terminal on the subVI. The initial value for the parameter may come from the default value of the control on the subVI. Any parameter data or source information that is set to a value other than default by the user in the configuration page may be stored in a table in the node's block state.

Figure 13:
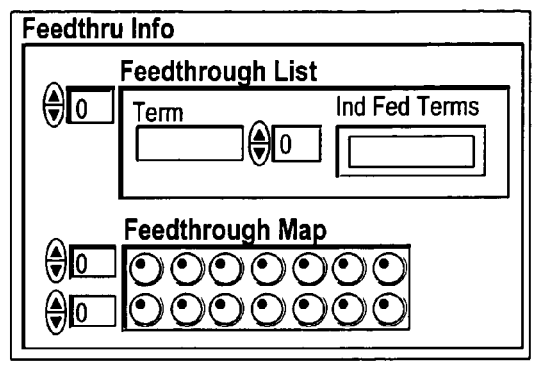
FIG. 13 illustrates an information dialog for a feed-through config subVI class, according to one embodiment.

FIG. 13—Feed-Through Config SubVI Wrapper Node

Referring again to FIG. 9, a feed-through config subVI class is shown derived from the config subVI wrapper class. FIG. 13 illustrates an information dialog for the feed-through config subVI class, according to one embodiment. The feed-through config subVI wrapper node may be used for non-direct feed-through blocks such as integrator and transfer functions. In one embodiment, the feed-through config subVI wrapper node may extend the config subVI wrapper node by adding a list of terminals that indirectly feed other terminals, as well as a feed-through map that may be generated for each property type pass to be used by its feed-through simulation node method, as shown.

Figure 14A:
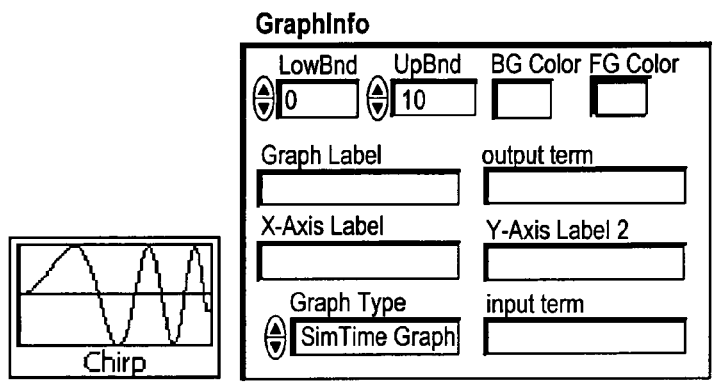
FIG. 14A illustrates an information dialog for a graph config subVI class, according to one embodiment.
Figure 14B:
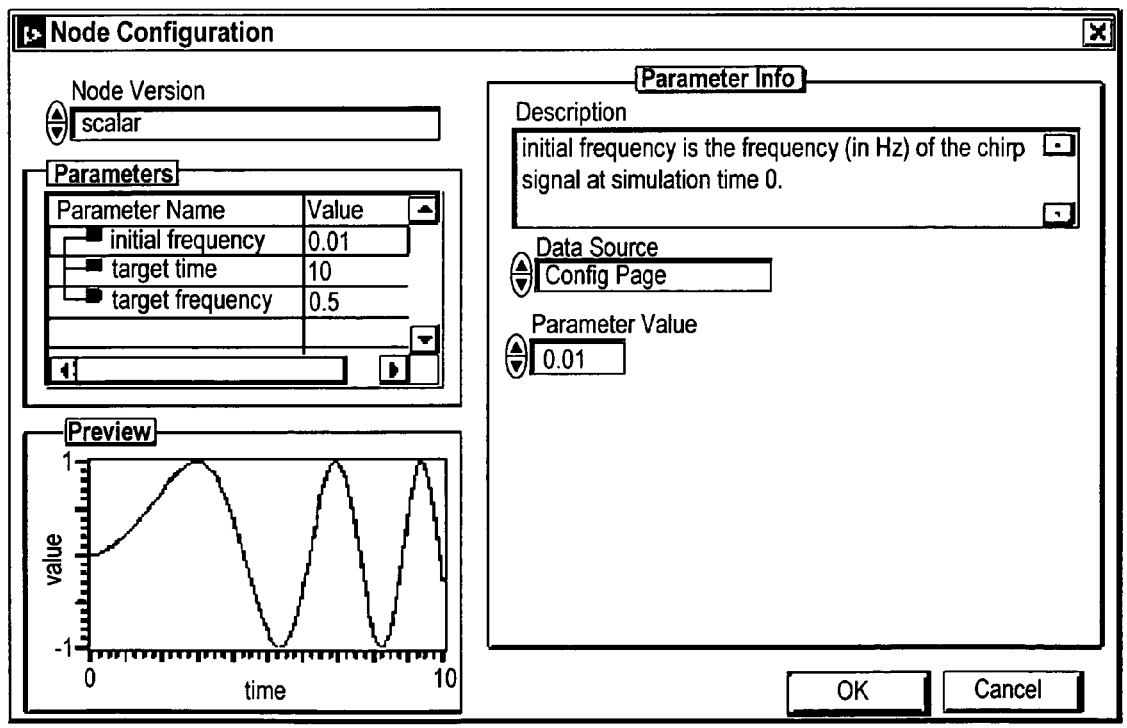
FIG. 14B illustrates an example node configuration dialog for the graph config subVI wrapper node of FIG. 14A, according to one embodiment.

FIGS. 14A and 14B—Graph Config SubVI Wrapper Node

As FIG. 9 also shows, in one embodiment, a graph config subVI wrapper class may also be derived from the config subVI wrapper class. FIG. 14A illustrates an information dialog for the graph config subVI class, according to one embodiment. FIG. 14B illustrates an example node configuration dialog for the graph config subVI wrapper node.

In one embodiment, the graph config subVI wrapper may extend the config VI wrapper to generate a chart depicting the value of one output of the node versus an input of the node, given the values of the parameters as set in the configuration page over a set range of values. This graph may be displayed on the configuration page and updated as parameter values are changed. Additionally, this graph may be displayed on the node's icon, which may be useful for signal generator blocks whose output varies as a function of the simulation time. Additionally, the graph may be used to display the effect of applying functions to signals, typically displaying f(y=x).

FIG. 14A illustrates a graph, referred to as a chirp graph, with an accompanying dialog box for configuring the graph. The graph displays a chirp signal, which is a signal whose frequency content increases with time. As FIG. 14A shows, in this embodiment, various fields may be provided for specifying upper and lower bounds for the graph, background and foreground colors (BG and FG Color), graph and axis labels, graph type, and input/output terms.

In the configuration dialog of FIG. 14B, various fields may be provided for configuring the node. For example, as FIG. 14B shows, fields may be provided for specifying node version (shown set to "scalar"), and for displaying and setting parameters such as initial frequency, target time, and target frequency (in the "Parameters" section of the dialog). As FIG. 14B also shows, a sub-panel (labeled "Parameter Info") may also be displayed whereby the user may specify a data source and value for a selected parameter. In one embodiment, a description of the selected parameter may also be provided for the user. In the embodiment shown in FIG. 14B, a preview graph is also displayed in the configuration dialog, allowing the user to view the behavior of a selected parameter given a particular configuration of the node. Note that the dialog and fields of FIG. 14B are exemplary only, and are not intended to limit the form, appearance, or functionality of the configuration dialog to any particular form or function.

FIGS. 15A and 15B—N-Ary Operation Node

Referring again to FIG. 9, an n-ary operation node class may be derived from the generic simulation node class. As is well known in the art, an n-ary operation receives n inputs and generates an output based on those inputs. Thus, the n-ary operation node may implement an operation that takes n inputs and outputs a result. One example of this type of simulation node or block is a summer block that wraps a compound arithmetic primitive.

Figure 15A:
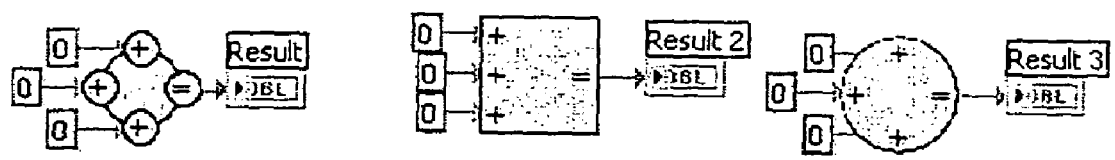
FIG. 15A illustrates three different embodiments of a summer block or node icon.
Figure 15B:
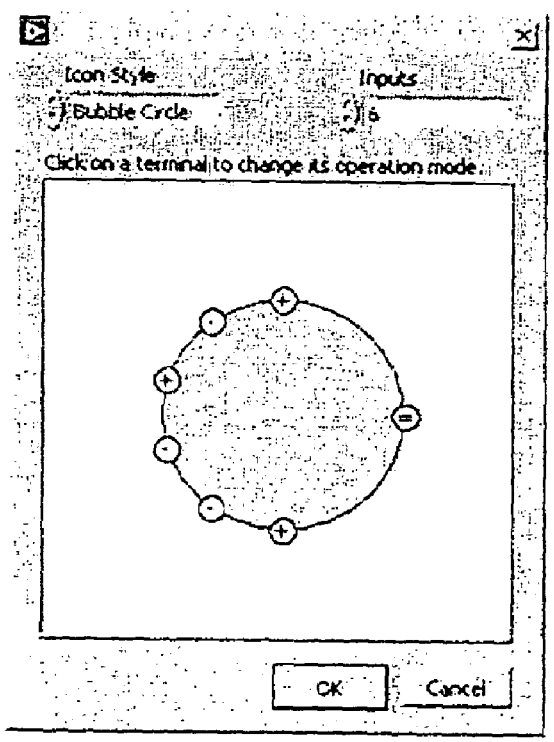
FIG. 15B illustrates an exemplary n-ary operation configuration dialog, according to one embodiment.

FIG. 15A illustrates three different embodiments of the summer block or node icon. Note that each block receives three inputs (in these cases, all zeros), and generates an output in double format (Result, Result 2, and Result 3). FIG. 15B illustrates an exemplary n-ary operation configuration dialog, whereby a user may select or otherwise specify such configuration parameters as icon style, number of inputs, and terminal operation modes, e.g., addition or subtraction.

The following lists exemplary simulation nodes with their respective parent node classes:

I. Continuous Linear

Integrator (vector and scalar)—Config SubVI Wrapper
Derivative (vector and scalar)—Config SubVI Wrapper
Transfer Function (SISO and MIMO)—Config SubVI Wrapper
Zero-Pole-Gain (SISO and MIMO)—Config SubVI Wrapper
State Space—Config SubVI Wrapper
Transport Delay (vector and scalar)—Config SubVI Wrapper II. Discrete Linear
  Integrator (vector and scalar)—Config SubVI Wrapper
  Transfer Function (SISO and MIMO)—Config SubVI Wrapper
  Zero-Pole-Gain (SISO and MIMO)—Config SubVI Wrapper
  State Space—Config SubVI Wrapper
  Unit Delay (vector and scalar)—Config SubVI Wrapper
  Zero Order Hold (vector and scalar)—Config SubVI Wrapper
  First Order Hold (vector and scalar)—Config SubVI Wrapper
  Filter (vector and scalar)—Config SubVI Wrapper
III. Non-linear
  Backlash (vector and scalar)—Graph Config SubVI Wrapper
  Friction (vector and scalar)—Graph Config SubVI Wrapper
  Deadzone (vector and scalar)—Graph Config SubVI Wrapper
  Quantizer (vector and scalar)—Graph Config SubVI Wrapper
  Rate Limiter (vector and scalar)—Config SubVI Wrapper
  Relay (vector and scalar)—Config SubVI Wrapper
  Saturation (vector and scalar)—Graph Config SubVI Wrapper
  Switch (vector and scalar)—Config SubVI Wrapper
  N-way switch? (vector and scalar)—N-ary Operation
IV. Signal Generators
  Sine Wave (vector and scalar)—Graph Config SubVI Wrapper
  Square Wave (vector and scalar)—Graph Config SubVI Wrapper
  Ramp (vector and scalar)—Graph Config SubVI Wrapper
  Signal Generator (vector and scalar)—Graph Config SubVI Wrapper
  Chirp Signal (vector and scalar)—Graph Config SubVI Wrapper
  Step Function (vector and scalar)—Graph Config SubVI Wrapper
V. Signal Arithmetic
  Gain (vector & scalar)—N-ary Operation
  Summer (vector and scalar)—N-ary Operation
  Multiplier (vector and scalar)
VI. Look Up Tables
  Look Up Table 1D (vector and scalar)—Graph Config SubVI Wrapper
  Look Up Table 2D (vector and scalar)—Graph Config SubVI Wrapper
  Look Up Table nD (vector and scalar)—Graph Config SubVI Wrapper
  Pre-Indexing Look Up Tables
VII. Graph/Chart Utilities
  XY Graph Memory
  SimTime Chart (vector and scalar)
VIII. Utilities
  Simulation Time—SubVI Wrapper
  Simulation Halt—SubVI Wrapper
  Other simulation parameter access blocks Note that the above simulation nodes and parent classes are intended to be exemplary only, and are not intended to limit the simulation nodes to any particular number, functionality, or parent class. For example, other signal generators are also contemplated, such as noise generators, etc.

In one embodiment, one or more of the simulation nodes may include a disable switch, whereby a user (or program) may turn the corresponding feature off.

Simulation Subsystems

In one embodiment, at least one of the simulation nodes represents a sub-simulation diagram, referred to as a simulation subsystem, where the sub-simulation diagram may comprise two or more additional simulation nodes. In other words, a simulation node may represent a plurality of additional simulation nodes, and thus may serve to represent or encapsulate a sub-simulation diagram.

In one embodiment, simulation subsystems primarily exist in order to implement sub-models, i.e. to graphically package parts of a simulation diagram in a simpler form, e.g., a node. To the user, a simulation subsystem may appear as a node whose root diagram is a simulation diagram, and may be placed (in LabVIEW subVI fashion) in a simulation diagram. However, when placed in a simulation diagram, these subsystems preferably execute as if inlined in the diagram, i.e. may execute elements of their diagram as inputs become available, rather than waiting for all inputs to the simulation subsystem node to be valid. Thus, simulation subsystems may provide a graphical shorthand, i.e., a way to group code elements together into a single icon. Key differences between simulation subsystems and LabVIEW subVIs may include one or more of the following:

1. Diagram placement—Simulation subsystems may only be used in a simulation diagram, while LabVIEW primitives may be used in standard LabVIEW block diagrams, and in some cases may be used in a simulation diagram.

2. Execution—When run as a free-standing VI, the simulation subsystem may execute its diagram as if it were contained within a simulation loop, thereby allowing the user to test and debug the diagram in isolation, e.g., without having to be enclosed in a simulation loop. When run in a simulation loop, e.g., as part of a larger data flow diagram, simulation subsystems may execute as if inlined, i.e. elements in the diagrams may execute as individual inputs become available.

3. Connection Feed-through—In addition to storing data types for inputs and outputs, the simulation subsystems may compute and store a feed-through mapping of inputs to outputs, e.g., for the additional simulation nodes comprised in the sub-simulation diagram.

4. Simulation Parameters—Simulation subsystems store default simulation parameters for their respective simulation diagrams for use when they are run as free-standing systems. However, when embedded in another simulation diagram (a parent diagram), the subsystems may inherit parameter values from the parent diagram.

Thus, similar to above, in one embodiment, one or more simulation parameters for the sub-simulation diagram may be configured and stored, where the configured one or more simulation parameters specify operation of the sub-simulation diagram. In a preferred embodiment, the two or more additional simulation nodes (in the sub-simulation diagram) are operable to execute in the simulation diagram in an inlined manner. Thus, the simulation subsystem (node) may utilize the feed-through mapping for simulation nodes comprised in the simulation subsystem's sub-simulation diagram to execute the simulation nodes appropriately, e.g., with indirect feed-through, as described above.

In one embodiment, the structure may comprise a simulation loop structure enclosing the second plurality of graphical program elements, where the simulation loop is operable to execute the simulation diagram one or more times to advance the simulation one time step. In one embodiment, the simulation loop may include input terminals for wiring in simulation parameters, error in and error out.

For example, in one embodiment, an optional input terminal may be provided in the top left corner of the loop that allows users to programmatically set a cluster of parameters for the enclosed simulation diagram. If this terminal is unwired, then the user may right-click on the border of the simulation loop and configure the parameters via a pop-up dialog. The bottom left corner may host the error input terminal and bottom right corner may host the error out terminal. Any error that occurs during simulation may be passed out using the error out terminal. These terminals may thus give users full programmatic control of the simulation loop.

In one embodiment, the simulation loop may comprise a LabVIEW loop structure containing a simulation diagram. The simulation loop may be similar to a LabVIEW "while" loop, e.g., may include a loop iterator terminal and a "stop" terminal. For each increment of the iterator output, the simulation loop may execute its simulation diagram sufficiently many times to advance the simulation one time step. The simulation loop may thus comprise a vehicle for embedding a simulation diagram into a LabVIEW diagram. Key differences between the simulation loop and a standard LabVIEW "while" loop may include:

1. The diagram enclosed in the loop is a simulation diagram, which may differ substantially from a standard LabVIEW block diagram, as described above.

2. The iteration terminal output is preferably incremented only on the beginning of a new time step, not with each execution of the diagram.

3. The "stop" terminal may only be evaluated at the end of a time step.

4. The simulation may stop when the simulation time reaches the specified stop time, or when the "stop" terminal specifies that the loop should stop, e.g., whichever comes first.

5. Simulation Parameters—The user may need to specify parameters for the simulation diagram contained within the loop. The specification of the simulation parameters may be performed programmatically and/or via static configuration, e.g., at compile time. In one embodiment, the simulation parameters may include an iteration method, start time, stop time, and time-step for the simulation. The simulation may stop when the final time is reached, or when a stop is signaled at the stop terminal. Additional parameters may include integrator tolerance (both relative and absolute), as well as minimum and maximum step sizes, among others.

Thus, summarizing the above, in one embodiment, the simulation loop structure may comprise a loop iterator terminal and a stop terminal, where the loop iteration terminal is incremented upon the beginning of a time step, where the stop terminal is evaluated at the end of a time step, and where the simulation is operable to stop at a specified stop time or when the evaluation of the stop terminal indicates that the simulation is to stop.

As described above, in one embodiment, the simulation diagram may correspond to a companion diagram in accordance with the first data flow semantics (or more generally, the first model of computation), where executing the simulation diagram may comprise executing the companion diagram. In other words, when the data flow diagram (or graphical program) is executed, the companion diagram may be executed in lieu of, or in conjunction with, the simulation diagram. In a preferred embodiment, the companion diagram is generated or scripted automatically when the simulation diagram is executed. Details of this scripting process for a simulation diagram are provided below.

In one embodiment, the term pre-scripting may refer to the state of a simulation diagram which has not been executed at all, i.e. the companion diagram has not been generated for it yet. The term post-scripting may refer to the state of a simulation diagram when the companion diagram has been generated. Finally, the term "dirty" may refer to the state of a companion diagram which has either not been scripted at all or a state in which is it not consistent with what is represented on the simulation diagram. Thus, after scripting (i.e. hitting a run button on the simulation diagram), if more items (nodes, signals etc.) are added to the simulation diagram, then the companion diagram may be set to the 'dirty' state. In other words, the "dirty" state indicates that the companion diagram is not up to date with respect to the simulation diagram.

Additional Features

In various embodiments of the present invention, additional features may be included or provided, e.g., for checking and debugging the simulation diagram. For example, in one embodiment, syntax checking may be supported, where types may be propagated on the simulation diagram, and where type problems and invalid cycles may be flagged as the user edits the simulation diagram. In another embodiment, debugging support may be provided, including for example, support for execution highlighting (mentioned above), breakpoints, and single stepping. Although execution during the evaluation of a simulation diagram may differ from LabVIEW diagrams (i.e. nodes may execute more than once in any diagram execution), in one embodiment, the following features may be provided or supported:

Detailed Debugging Information:

To achieve debugging in the simulation diagram a table of mappings may be provided or determined which map nodes and signals in the simulation diagram to the respective nodes and signals in the companion diagram. There are generally more nodes in the companion diagram than in the simulation diagram. The mapping tables may be populated when the companion diagram is being scripted or generated. Below are listed several features which may be provided for debugging the simulation diagram.

Breakpoints

Similar to LabVIEW, setting a breakpoint on a simulation node may suspend execution of the diagram in which the node is comprised as soon as the node just prior to it in execution order finishes (i.e., a precursor node). However, simulation subsystems may introduce some added complexity to this mechanism. Since simulation subsystems are preferably executed as if inlined into the diagram, a simulation subsystem node may in fact be split up into pieces that execute in separate clumps. In this case, there may be more than one "immediate precursor" node, and execution may halt following the execution of any and all of these precursor nodes. Setting a breakpoint on a signal may suspend the execution of the simulation diagram just after the execution of the node which owns the source terminal. Setting a breakpoint on a simulation diagram may suspend execution of the simulation diagram just before the first set of node executions for the simulation diagram evaluation (i.e. on the first iteration of a time step).

In one embodiment, breakpoints may be added pre-scripting or post-scripting. For example, if the user adds a breakpoint on the simulation diagram in the pre-scripting state, the breakpoint may be set on the companion diagram automatically via scripting the first time when the run button is hit. After the scripting is done, companion diagram debugging information may be propagated back to the simulation diagram. In one embodiment, highlighting a node on the companion diagram may be propagated to the simulation diagram. If the user clears a breakpoint on the simulation diagram before the companion diagram has been scripted (pre-scripting), nothing further is required.

Alternatively, if the user adds a breakpoint on the simulation diagram in the pre-scripting state, i.e., after the companion diagram is generated, then if the companion diagram is not 'dirty' (no modifications have been made in the simulation diagram such as addition/removal of nodes or signals, and so forth), then a breakpoint may be set on the companion diagram at the appropriate place (a forward mapping of nodes from the simulation diagram to the companion diagram may be used to determine the appropriate place). If the user clears a breakpoint on the simulation diagram after the companion diagram is generated (post-scripting), a determination may be made as to whether the companion diagram is 'dirty', and if the companion diagram is not dirty then the breakpoint may be removed from the simulation diagram as well as the companion diagram.

In one embodiment, undo/redo breakpoints (for both post/pre-scripting) may be supported, allowing the user to toggle any specified breakpoints. In another embodiment, the user may also be allowed to browse breakpoints, e.g., by selecting Browse>>Breakpoints (or equivalent) from a menu, in response to which only the breakpoints on the simulation diagram may be displayed. In other words, from the user's perspective, all interactions related to the companion diagram are preferably mediated by the simulation diagram. For example, the user may not even be aware of the companion diagram, but may only be allowed to view and interact with the simulation diagram.

In one embodiment, breakpoints may also be supported for simulation subsystems. For example, when a breakpoint is set on a simulation subsystem (e.g., pre/post-scripting), breakpoints are preferably set on corresponding node(s) in the simulation subsystem's sub-diagram (i.e., nodes which can fire independently).

Probes

In one embodiment, probes may be supported, whereby a user may ascertain information regarding the operation of the simulation diagram. For example, when a probe is dropped on a simulation diagram signal in pre-scripting state (the companion diagram has not been generated), the probe may be linked to the simulation diagram signal and also drawn on it. During the generation (scripting) of the companion diagram the probes may be copied over one by one to the companion diagram. In the copying process the probes may be linked to the corresponding companion diagram signal, but are preferably still drawn on the simulation diagram signal. Alternatively, when a probe is dropped on a simulation diagram signal in post-scripting state (the companion diagram has been generated), the probe may be drawn on the simulation diagram signal, but may receive its updates from the companion signal, i.e., the probe is preferably linked to the corresponding companion signal. When a probe (e.g., a smart or generic probe) is dropped, an indicator or parameter (e.g., a probe mask) may be set on both the simulation diagram signal and the companion signal. When the probe is removed, the indicator or parameter (probe mask) may be removed from both signals.

Execution Highlighting

As noted above, in one embodiment, execution highlighting may be supported, in the simulation diagram and/or the companion diagram. For example, in one embodiment, tokens may flow on simulation diagram signals when their source terminals fire. In the case of multiple node execution for a single execution of the simulation diagram, there may be cases where an input is required but the source terminal for the signal does not fire during that iteration of the simulation diagram. In this case, the input may be the value of the token that flowed on the previous iteration. This value may preferably not flow down the wire if the terminal does not fire, although the value may appear on the input as the node fires.

As nodes in the companion diagram are executed, the nodes that map back to the simulation diagram may be highlighted, e.g., with their signals illustrated graphically, e.g., by drawing bubbles. Note that in a preferred embodiment, nothing in the simulation diagram is actually executed. In other words, the companion diagram is executed in lieu of the simulation diagram, where the activity and results of the companion diagram, e.g., the values and drawing of the bubbles and graying out, are propagated from the companion diagram to the simulation diagram. The companion diagram may thus interface to the rest of the data flow diagram, e.g., the portion of the data flow diagram with first data flow semantics, via the simulation diagram, e.g., via the coupling or boundary between the simulation diagram and the rest of the data flow diagram.

Single Stepping

In one embodiment, single stepping and pause functionality may be supported. For example, "pausing" a diagram may preferably cause the diagram to act as if breakpoints had been set on all nodes visible in the diagram. All regular subVIs and all primitives (simulation and otherwise) may also support "step into", as is well known in the art of debugging. Similarly, "step out" functionality may be provided whereby the user may step out to the end of the time step for the simulation diagram. Additionally, "step over" functionality may also be provided, where execution of the diagram preferably continues until the next breakpoint is reached. In one embodiment, for simulation subsystems, only "step over" may be allowed, i.e., "step in" may not be needed or allowed because the simulation subsystems are preferably inlined.

Thus, in one embodiment, debug information may be provided for the first portion of the third graphical program in accordance with the first model of computation, and for the second portion of the third graphical program in accordance with the second model of computation. Similarly, in one embodiment, debug information may be received (e.g., from a user or developer) for the first portion of the third graphical program in accordance with the first model of computation, and from the second portion of the third graphical program in accordance with the second model of computation.

Conversion of Simulation Diagram

As described above with respect to FIG. 6, in one embodiment, the second data flow diagram (which is preferably a second portion of an encompassing third, heterogeneous, data flow diagram), i.e., the simulation diagram, may be converted to the first data flow diagram with the first data flow semantics, e.g., a LabVIEW data flow diagram.

In the context of the simulation diagram example, the second data flow semantics may specify a heterogeneous model of computation. For example, the second data flow semantics may support a multi-rate execution of graphical program elements, and may also include explicit feedback connections to implement looping. This is in contrast to the first data flow semantics, which may preferably support only direct feedthrough for inputs and outputs of graphical program elements. In a preferred embodiment, the second data flow diagram comprises a control block diagram utilizing control block notation. More specifically, the second data flow diagram preferably comprises a simulation diagram, where at least a subset of the second plurality of graphical program elements comprise simulation nodes, and where the simulation diagram implements a simulation.

Thus, in one embodiment, at least one of the simulation nodes executes two or more times per execution of the simulation diagram. Similarly, in one embodiment, the simulation nodes may support direct feed-through and indirect feed-through for inputs and outputs of the simulation nodes. Said another way, in one embodiment, at least one of the simulation nodes includes a plurality of inputs and a plurality of outputs, where a first output of the plurality of outputs requires only a subset of the plurality of inputs, and where the least one of the simulation nodes is operable to fire upon reception of the subset of the plurality of inputs to generate the first output.

In one embodiment, at least one simulation node of the simulation nodes supports a feedback cycle between an output of the simulation node and an input of the simulation node, or between an input and an output of a sequence of simulation nodes. However, in some embodiments, this feature may be conditioned on the relationship between the input and the output of the node(s). For example, in one embodiment, the at least one simulation node of the simulation nodes may support a feedback cycle between an output of the simulation node and an input of the simulation node if: the input of the simulation node has indirect feed-through to the output of the simulation node, and/or the input of the simulation node corresponds to a different iteration than the output of the simulation node. This restriction may also apply to sequences of simulation nodes.

In a preferred embodiment, converting a simulation diagram (also referred to as a control block diagram) with the second data flow semantics to a data flow diagram with the first data flow semantics preferably includes generating a companion diagram, where the companion diagram implements the functionality (and the second data flow semantics) of the simulation diagram, but where the implementation itself operates in accordance with the first data flow semantics.

The following describes one embodiment of the conversion process. In the description below, the first data flow diagram is assumed to be a LabVIEW diagram, although it is noted that any other type of data flow diagram and semantics may also be used.

First, all items in the simulation diagram may be copied to the LabVIEW companion diagram, and surrounded with a timed loop, where the loop may be operable to iterate successive time steps of the simulation (timing can be determined by software and/or hardware). The parameters of the timed loop may be exposed via a configuration page (e.g., the same configuration page which is used for configuring the simulation parameters).

All simulation nodes in the companion diagram may then be inlined. In other words, any simulation subsystems, i.e., simulation nodes that represent or include other nodes (e.g., subVIs) may be expanded until the companion diagram includes only atomic nodes or simulation primitives. Said another way, all simulation node hierarchies are decomposed to their lowest level constituent simulation primitives, resulting in a single-level simulation diagram.

Any control and indicator nodes in the simulation diagram may then be moved to the edges of the loop, and the remaining nodes surrounded with a nested while and for loop to implement multi-stage (e.g. Runge-Kutta) processing or execution.

The simulation primitives may then be replaced with LabVIEW graphical program elements, e.g., nodes or VIs, that implement the functionality of the simulation primitives.

All indirect feed-through inputs may be implemented by buffering them with a shift register. Note that inputs to simulation primitives preferably directly feed all or none of the outputs. However, this restriction may not apply to the more general class of simulation nodes.

Finally, in one embodiment all simulation primitives may be threaded with a simulation data signal according to an execution partial order determined by topological analysis. Such a partial order is guaranteed to exist as long as the diagram has no direct feed-through cycles between simulation primitives. In one embodiment, any simulation primitives that do not modify the simulation data may be wired first in a "star" fashion. All other simulation primitives may be subsequently threaded according to the determined partial order.

Note that in a preferred embodiment, the conversion process described above, referred to as a scripting step, is a "pre-compile" step, and so is preferably performed prior to compilation. Note also that the compilation is preferably performed on the companion diagram rather than the simulation diagram.

Editing and Debugging Simulation Diagrams

In one embodiment, after the companion diagram has been generated, the user may wish to edit the simulation. As noted above, in some embodiments, the companion diagram may not be displayed, and so the user may not have access to (or even be aware of) the companion diagram. Thus, in a preferred embodiment, all user edits occur in the simulation diagram, although the corresponding executable code is generated from the companion diagram, and so any edits made to the simulation diagram are preferably reflected in the companion diagram. In a preferred embodiment, prior to compilation of the companion diagram, the simulation diagram may be checked for consistency with respect to syntax, data types, and so forth. For debugging purposes, nodes and signals (e.g., data communicated between the nodes) may be mapped to counterparts on the simulation diagram.

A primary key for debugging the simulation diagram is the mapping of simulation nodes and their output terminals in the simulation diagram to the companion diagram. With the exception of simulation subsystems, nodes may map uniquely from the simulation diagram to the companion diagram. Signals in general may not map uniquely, however, output terminals do, and so signals may be mapped directly to corresponding signals of corresponding output terminals. Thus, with the exception of simulation subsystems, this may facilitate generation of a sparse set of debugging code. For example, rather than inserting debugging checks after the execution of every node, debugging checks may only be inserted following the execution of nodes that immediately precede nodes represented on the simulation diagram.

The mapping of simulation subsystems is more complex, but since each instance of a simulation subsystem maps to a unique collection of nodes, it may suffice to put breakpoint checks on every node that executes immediately before any node in the collection. Furthermore, each output terminal of a subsystem may map uniquely to an output terminal of a node in the collection, and so execution highlighting of signals may retain the mapping rule of signals to corresponding owning terminals as described above.

In one embodiment, the propagation of edits made to the simulation diagram to the companion diagram may be accomplished by clearing the companion diagram each time an edit is made to any node contained in the simulation diagram. An alternative approach is to maintain a mapping of objects in the simulation diagram to objects in the companion diagram, and only update those elements in the companion diagram whose corresponding elements in the simulation diagram have been edited.

One of the steps in generating or scripting the companion diagram is to thread the simulation data signal through all of the simulation primitives that modify it. In effect, this threading may specify a sequential firing order for the simulation primitives. However, as noted above, it is possible for an output of one primitive to feed a direct feed-through input of another primitive. Hence, an analysis may be performed on either the scripted companion diagram or the simulation diagram to determine these dependencies and to find a workable firing order for the simulation primitives. In a preferred embodiment, a topological sort may be performed on the scripted companion diagram before threading the simulation data signal, and then setting the firing order accordingly. Thus, in one embodiment, the scripted (programmatically generated) diagram may be analyzed to determine the firing order of the simulation primitives. For example, the diagram may be analyzed to determine the data dependencies and hence determine the order of execution of the simulation primitives.

The configuration of execution parameters, e.g., integration method, step size, etc., for the simulation diagram may be performed manually or programmatically. For example, in the manual case, the user may specify the parameters via configuration dialogs, scripts or initialization files, etc. In one embodiment, these parameters may be set by the owner(s) of the simulation diagram (e.g., either the simulation loop or the simulation subsystem/subVI). Alternatively, programmatic configuration of these parameters may be performed via communication with external systems or programs, or by additional program elements included in the data flow diagram.

Example: Synchronous Data Flow Diagram

Another example of non-homogenous or heterogeneous data flow semantics relates to synchronous data flow (SDF). As is well known in the art, synchronous data flow refers to a model of computation that uses a directed graph syntax, and where function nodes, referred to as actors, represent respective computations, and are interconnected by edges that represent one-way first-in first-out (FIFO) queues. Each actor typically produces and consumes a fixed number of tokens onto or from each input/output edge.

Benefits of using an SDF model of computation include the ability to model multi-rate systems effectively, the ability to generate static schedules at compile time, ability to optimize the static schedules for minimum program memory or buffer memory for single processor targets, e.g., for embedded systems, and the fact that synchronous data flow is widely used and well studied. The restricted semantics of SDF allows it to be deterministic and statically schedulable at compile time, which enables powerful optimizations to be performed by the compiler. These properties make SDF a good candidate for developing code for small embedded targets where determinism and optimal use of resources is critical, such as, for example, multi-rate DSP systems.

Thus, in one embodiment, the second data flow semantics may specify a synchronous data flow (SDF) model of computation. In a preferred embodiment, the structure indicating use of the second data flow semantics for graphical program elements comprised within the structure may comprise a multi-rate loop structure enclosing the second plurality of graphical program elements, where at least two of the second plurality of graphical program elements have different execution rates.

It should be noted that many of the features and techniques described above with respect to simulation diagrams also apply to SDF diagrams, and so it is contemplated that any of the techniques and processes described above may also be utilized with respect to SDF diagrams.

Thus, in one embodiment, the second plurality of graphical program elements may comprise an SDF diagram. Said another way, in one embodiment, the second plurality of graphical program elements may comprise SDF nodes interconnected via one or more edges, where each edge specifies a first-in, first-out (FIFO) buffer and a delay. Furthermore, in one embodiment, each SDF node may be specified to consume a respective first number of tokens, and may be further specified to produce a respective second number of tokens, where the delay for each edge specifies an initial number of tokens residing on that edge.

Generally, in SDF diagrams, a node is enabled for execution when enough tokens are available on all inputs. Source nodes with no inputs are thus always enabled. As noted above, the number of tokens produced and consumed by a node is fixed and may be known at compile time.

Figure 16A:
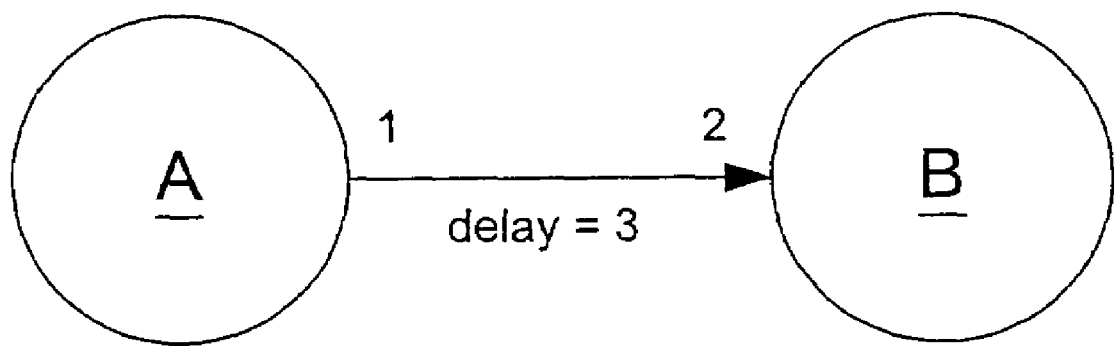
FIGS. 16A and 16B illustrate embodiments of a simple synchronous data flow (SDF) diagram.
Figure 16B:
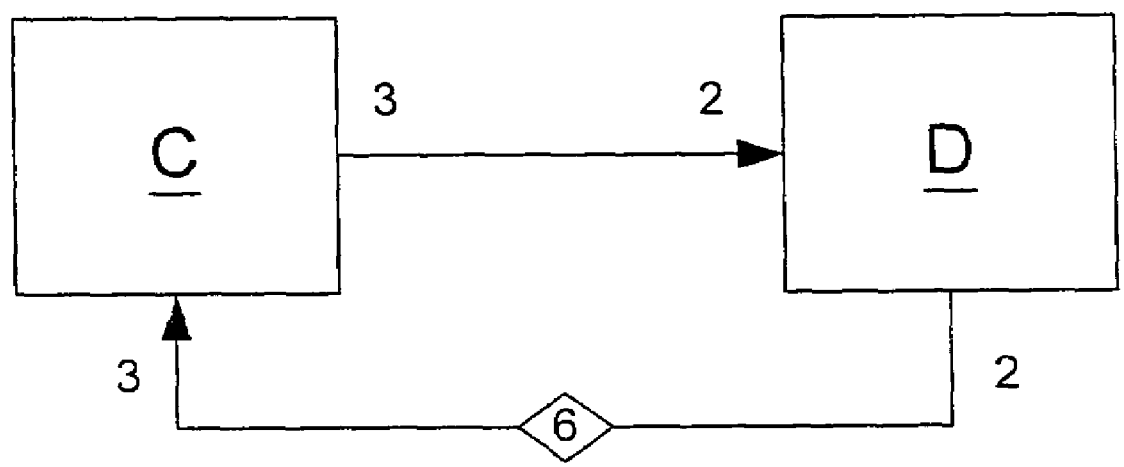

FIGS. 16A and 16B—Simple SDF Diagrams

FIG. 16A illustrates a simple SDF diagram, including actors A and B, and an edge that produces one token and consumes two tokens. As shown the edge has a delay of three. Thus, actor (node) B may fire twice for each single firing of A, and due to the delay of three, will process the first output of A upon B's second firing. (is this correct???) When B fires, the consumed data is dequeued from the edge (also known as an arc), and used to compute B's output. Note that the SDF diagram of FIG. 16A is a simple example, and is intended only to illustrate the basic aspects of an SDF diagram.

FIG. 16B illustrates another simple SDF diagram presented in a slightly different format, where actors C and D are coupled by two edges, one of which produces three tokens and consumes two tokens, and a second that produces two tokens and consumes three tokens. As FIG. 16B shows, the second (bottom) edge has a delay of six, indicated by the diamond overlaid on the edge. In other words, six tokens are initially in queue for the second edge or arc. Note that this SDF diagram includes an explicit feedback loop, where the output of actor D is provided as input to actor C.

It should be noted that in some embodiments, while the nodes or actors of the diagram may not themselves be multi-rate elements, the diagram itself may be multi-rate. Note also that the history of tokens produces on edges is not dependent on the execution order of the nodes. In other words, the nodes or actors may execute in sequence or in parallel and should produce the same output in either case.

Figure 17A:
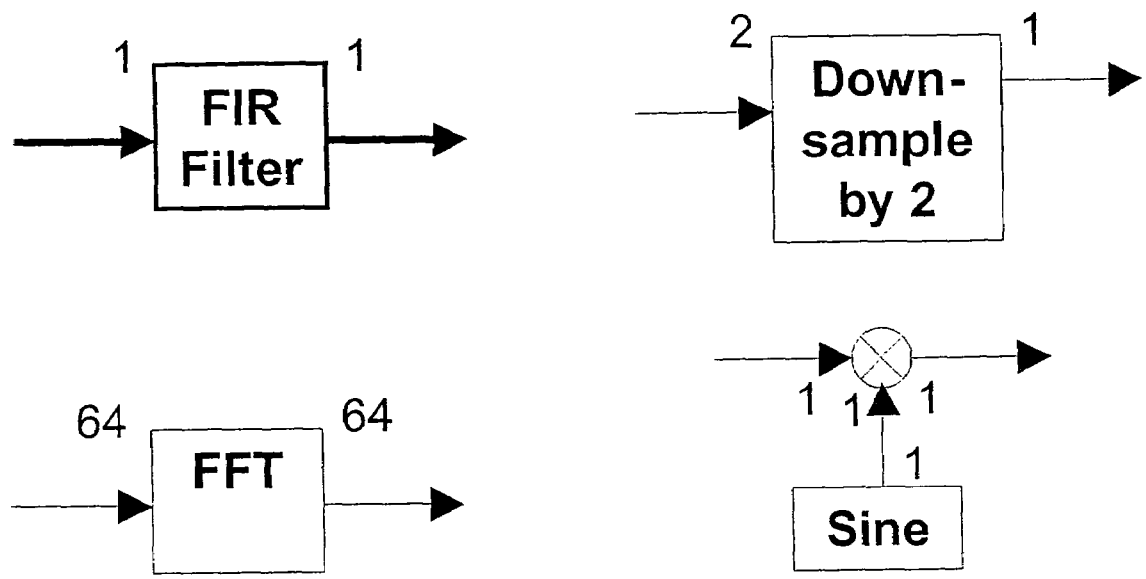
FIG. 17A illustrates several multi-rate actors for implementing a multi-rate system, according to one embodiment.
Figure 17B:
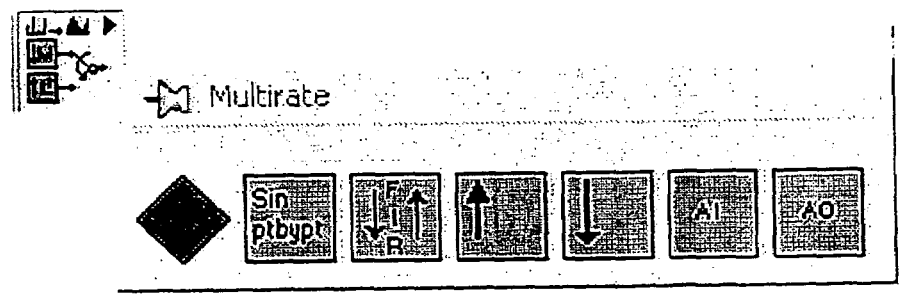
FIG. 17B illustrates one embodiment of a "multi-rate" palette for creating an SDF diagram, according to one embodiment.

FIGS. 17A and 17B—SDF Actors and Multi-rate Actor Palette

As noted above, multi-rate actors may be particularly suitable for modeling multi-rate systems such as signal processing and communications systems. Examples of signal processing systems include finite impulse response (FIR) filters, infinite impulse response filters, Fast Fourier transforms (FFT), and filter banks, among others. Examples of communications systems include sinusoidal modulators/demodulators, pulse shapers (often FIR filters), and transmission subsystems, among others.

FIG. 17A illustrates several multi-rate actors that model some of the above multi-rate systems, including an FIR filter actor that produces and consumes one token per firing, an FFT actor that produces and consumes 64 tokens per firing, a down-sampler or decimator actor that consumes two tokens and produces one token per firing, and a sinusoidal modulator that consumes two tokens (on two incoming edges) and produces one token. Note that the sine component is a source actor, and only produces a token. Of course, these actors are meant to be exemplary only, and are not intended to limit the types or functionalities of actors to any particular type or function.

FIG. 17B illustrates one embodiment of a "multi-rate" palette that may be presented to a user for creating an SDF diagram. As shown, multi-rate actors may be displayed in the palette for selection by the user for inclusion in the diagram, e.g., by dragging and dropping the actor icons from the palette onto the diagram. Exemplary actors shown in this example palette include (from left to right) a delay icon, for specifying the initial tokens on an edge or wire, a sine signal generator, an FIR filter, an up sample node (up arrow), a down sample node (down arrow), an analog input actor, and an analog output actor. Note that the actors shown in the palette are for example only, and that any other type of multi-rate actors may be included in the palette.

Figure 18:
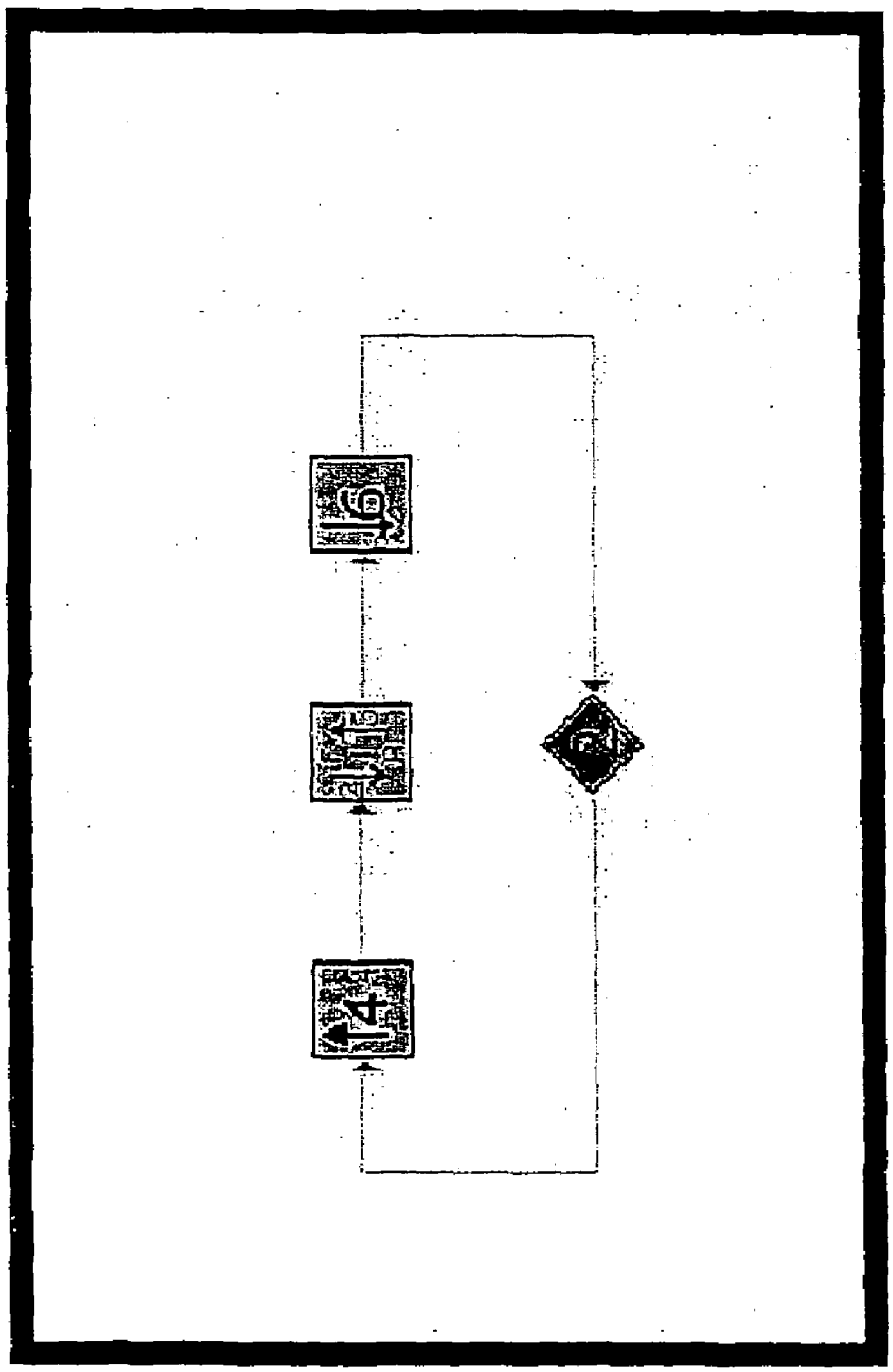
FIG. 18 illustrates an example SDF diagram created using some of the actors from the palette of FIG. 17B, according to one embodiment.

FIG. 18—Example SDF Diagram

In one embodiment, the user may create an SDF diagram in much the same way that a LabVIEW data flow diagram is created. For example, the user may select various actors (nodes) from a palette, such as the palette of FIG. 17B, "drag and drop" the actors onto the SDF diagram, and wire or otherwise interconnect the actors to implement the desired data flow. FIG. 18 illustrates an example SDF diagram created using some of the actors from the palette of FIG. 17B. As shown, the up sample actor, the FIR filter actor, and the down sample actor are connected in sequence, and an explicit feedback cycle is implemented by an edge with a delay of two (i.e., two initial tokens). Note that token consumption/production for each node is indicated on the actor icons.

As noted earlier, in one embodiment, a structure may be displayed or included in the diagram that indicates use of the second data flow semantics, in this case, the SDF model of computation, for graphical program elements (actors) enclosed in the structure. Thus, the SDF diagram of FIG. 18 includes a structure that encloses the SDF diagram, i.e., the black rectangle surrounding the diagram. In one embodiment, the structure may substantially comprise the simulation loop structure, described above with reference to the simulation diagram example.

As also indicated above, in preferred embodiments, the SDF diagram may itself be included in a larger data flow diagram, as described with reference to FIG. 5. Thus, the structure may effectively separate the actors from graphical program elements in the data flow diagram that have different data flow semantics, e.g., LabVIEW graphical program elements that operate according to the first data flow semantics, i.e., with a homogenous model of computation.

The actors or SDF nodes are preferably multi-rate actors. In other words, each actor in the SDF diagram may be capable of firing or executing multiple times within one schedule period of the diagram. Said another way, each actor may execute multiple times for each execution of the SDF diagram. Another aspect of multi-rate actors is that each actor may consume and/or produce more than one token at each firing. In one embodiment, the actors may also support explicit feedback cycles, as described above; however, it may be necessary to include delays (e.g., on the edges) to prevent deadlocks during execution of the diagram. These features of multi-rate actors are in contrast to those of single-rate nodes such as LabVIEW nodes, which may only fire once per schedule period, and which may only consume and produce one token per firing. Additionally, as noted above, LabVIEW nodes do not support explicit feedback cycles, relying instead on looping structures to implement iterative processing.

Thus, in a preferred embodiment, the user may drop SDF actors or nodes which consume and produce different numbers of tokens onto an SDF diagram, i.e., within the SDF structure, wire feedback between these actors, and specify delay elements in the wires which are the initial tokens on each wire.

In one embodiment, one or more parameters may be configured and stored for the SDF diagram, where the configured one or more parameters specify operation of the SDF diagram. For example, in one embodiment, timing information may be specified on the SDF diagram, i.e., the SDF diagram may be a timed SDF diagram. In one embodiment, the configuration of the one or more parameters may be performed manually, e.g., via user input to dialogs, configuration files, property nodes, etc. Alternatively, in another embodiment, the configuration of the one or more parameters may be performed programmatically, e.g., by an external program or system coupled to the SDF diagram or development environment.

Synchronous Data Flow Scheduling

One general requirement of SDF diagrams is that during execution of the diagram all tokens produced should be consumed, thereby bringing the diagram back to its original state. Thus, in one embodiment, load balancing may be performed to ensure this balance between production and consumption of tokens. This is generally a task of linear complexity, e.g., the time and resources required to load balance the diagram varies linearly with the number of nodes or actors, e.g., with the size of the diagram.

FIGS. 19-21B—Conversion of SDF Diagram

As described above with respect to FIG. 6, in one embodiment, the second data flow diagram (which is preferably a second portion of an encompassing third, heterogeneous, data flow diagram), i.e., the SDF diagram, may be converted to the first data flow diagram with the first data flow semantics, e.g., a LabVIEW data flow diagram.

In the context of the SDF diagram example, the second data flow semantics may specify a heterogeneous model of computation, e.g., the second data flow semantics may support a multi-rate execution of graphical program elements (the multi-rate actors), and may also include explicit feedback connections to implement iterative execution or looping. The second data flow diagram preferably comprises an SDF diagram, where at least a subset of the second plurality of graphical program elements comprise SDF nodes or actors. Thus, in one embodiment, at least one of the actors executes two or more times per execution of the SDF diagram, i.e., multiple times per schedule period.

In one embodiment, at least one actor or node in the SDF diagram supports a feedback cycle between an output of the actor and an input of the actor, or between an input and an output of a sequence of actors, such as illustrated in FIG. 18. However, as described above with respect to simulation nodes, in some embodiments, this feature may be conditioned on the relationship between the input and the output of the actor or sequence of actors.

The following describes one embodiment of the conversion process from an SDF diagram to a LabVIEW diagram. Although in the description below, the first data flow diagram is assumed to be a LabVIEW diagram, it is noted that any other type of data flow diagram and semantics may also be used. It should be noted that in various embodiments, any of the techniques, elements, and concepts described with respect to simulation diagrams may also be used with SDF diagrams, and vice versa.

The SDF diagram may be parsed, and a repetitions vector calculated for the diagram. As is well known in the art, the repetitions vector comprises a vector of positive integers indexed by the actors which specify the number of times each actor should be invoked or executed in order that the sample rates balance, i.e., the number of tokens produced onto an edge can be consumed completely. In other words, the repetitions vector specifies a respective number of times each SDF node should fire to consume all tokens. For example, for the SDF diagram of FIG. 16A, the repetitions vector is given by:

qG(A, B)=[2, 1]

If a diagram has rates that cannot be balanced, the diagram may be deemed sample rate inconsistent and the conversion process for the diagram may be terminated.

Figure 19:
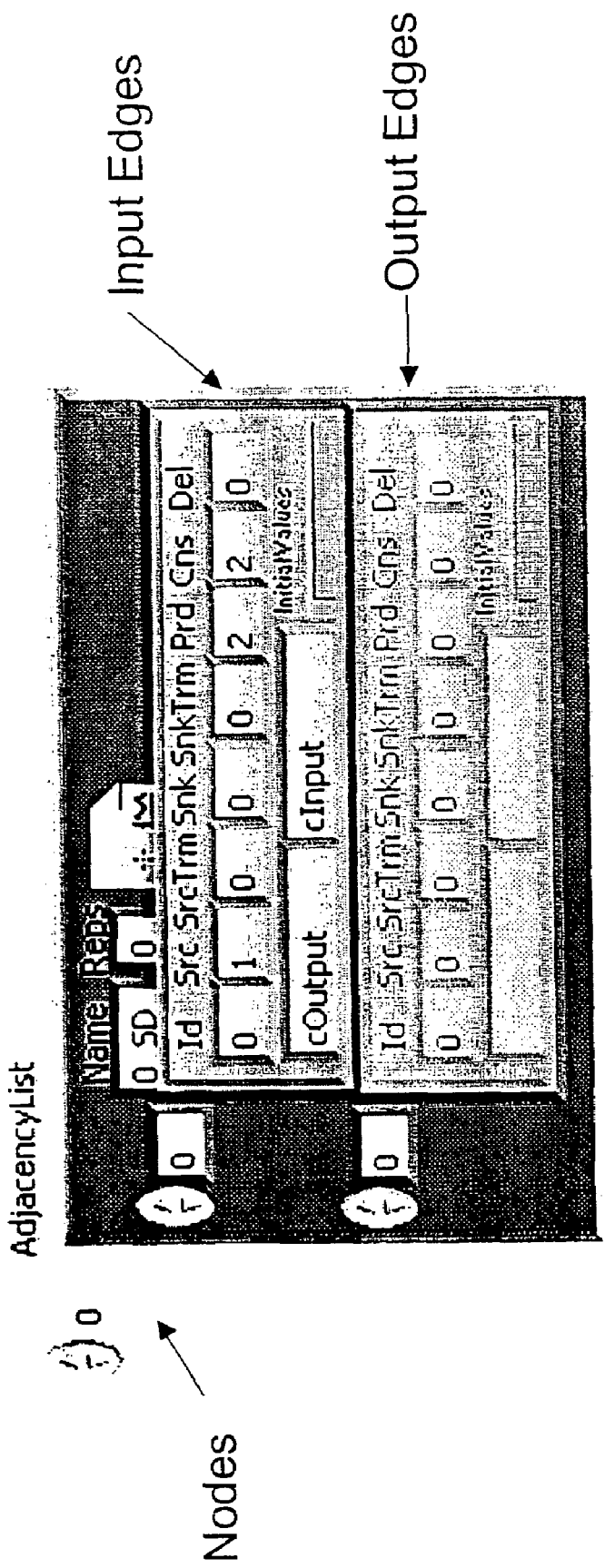
FIG. 19 illustrates one embodiment of a tool or dialog to facilitate parsing an SDF diagram, according to one embodiment.

FIG. 19 illustrates one embodiment of a tool or dialog to facilitate parsing the SDF diagram. The dialog represents a data structure that stores parameters that specify the structure or topology of the SDF diagram. As FIG. 19 shows, fields and/or controls may be provided for specifying or indicating actors (nodes), as well as input and output edges for the actors. In a preferred embodiment, the dialog/data structure may comprise an adjacency list, as is well known in the art of graph theory, where the nodes and their interconnecting edges are specified or stored.

In one embodiment, a linear complexity algorithm may be used to determine the number of firings for each actor required to return the diagram to its original state, i.e., to compute the repetitions vector. For example, in one embodiment, the repetitions vector for the SDF diagram may be determined thusly:

One of the SDF nodes or actors may be selected, and a repetitions rate for that node set to one. The SDF diagram may then be traversed starting with the node using depth first search on the input edges, and appropriate repetition rates determined for each node traversed, e.g., based on the tokens produced and consumed by each node. Note that these rates are determined relative to the selected node. The SDF diagram may then be traversed again, starting with the node using depth first search, but this time on the output edges, and appropriate repetition rates determined for each node traversed.

If the repetition rates for both traversals are not equal, the SDF diagram is sample rate inconsistent, and so the conversion process may be terminated. If they are equal, the SDF diagram is considered sample rate consistent, and so the repetition rates may be normalized to integers (thereby correcting for the fact that the rates were determined relative to the selected node) and the results returned as the repetitions vector.

Figure 20:
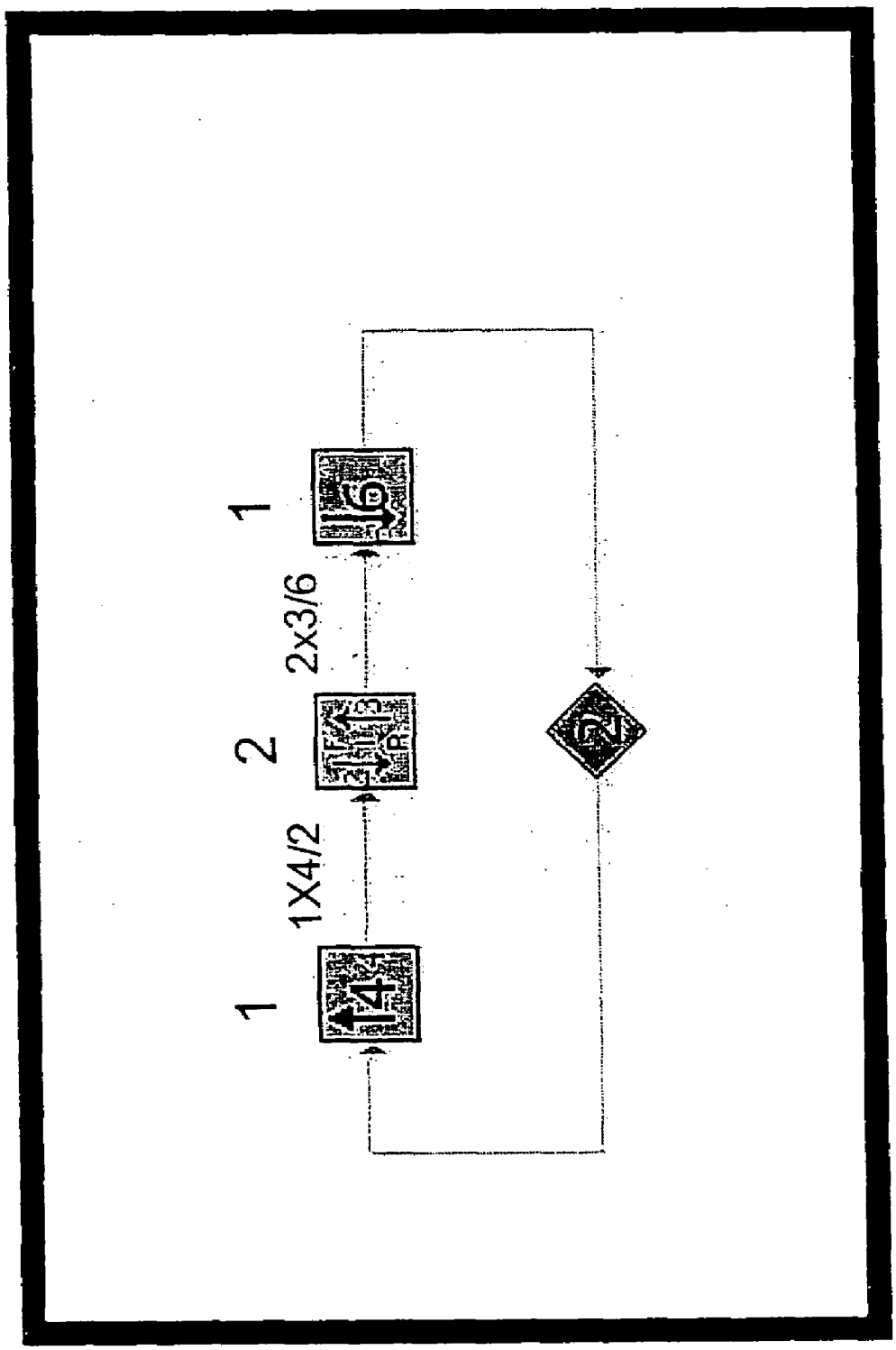
FIG. 20 illustrates calculation of the repetitions vector for the SDF diagram of FIG. 18, according to one embodiment.

FIG. 20 illustrates calculation of the repetitions vector for the SDF diagram of FIG. 18. As FIG. 20 shows, the repetition rate of the first actor (from left to right) is set to one (indicated above the actor icon). Now, traversing the input edges, the first actor consumes one token at its input edge, which connects to the third actor (far right) that produces one token, giving a repetition rate of one for that (third) actor. Traversing onward from the third actor to the second (middle) actor, the third actor consumes six tokens at its input edge, while the second actor produces three, giving a repetition rate of two for the second actor. Finally, the second actor consumes two tokens at its input edge, but has a repetition rate of two, giving four tokens, which is matched by the consumption of four tokens by the first actor.

Now, traversing the output edges, the first actor produces four tokens with a repetition rate of one. The second actor consumes two tokens per firing, and so requires a repetition rate of two. The second actor produces three tokens per firing, and has a repetition rate of two, producing six tokens, which is matched by the consumption of six tokens by the third actor, giving a repetition rate of one for the third actor. Thus, the repetition rates for the two traversals match, and the resultant repetitions vector is [1,2,1].

Once the repetitions vector is determined, a valid periodic schedule of firings for each of the actors may be determined or computed based on the repetitions vector, such that each actor is specified to be fired exactly the number of times specified in the repetitions vector, so as to bring the diagram back to its original state when executed. It is possible that the diagram may not have a valid periodic schedule due to an insufficient number of delays, in which case the conversion process may be terminated. An SDF diagram which does have a valid periodic schedule may also have many other valid periodic schedules which can have varying amounts of program and buffer memory requirements, as is well known in the art. In a preferred embodiment, computing the valid periodic schedule for the SDF diagram is performed at compile time.

There are numerous approaches to scheduling that may be used, including for example, list scheduling, which may entail exponential complexity in the worst case, heuristics to minimize buffer size, which may entail cubic complexity, and parallel schedulers, among others. In one embodiment, the SDF diagram may be converted to an acyclic precedence diagram, i.e., a homogenous feed-forward data flow diagram, although this may entail a worst case exponential increase in the number of nodes in the diagram.

In a preferred embodiment, a class-S algorithm may be used to determine the valid schedule. In this approach, valid schedules are constructed given a positive integer multiple of the repetitions vector r where r=k q for some positive integer k. A class-S algorithm maintains the state of the system as a vector b that is indexed by the edges of the SDF graph. Once an actor A has been scheduled r(A) times, a class-S algorithm does not schedule A again. A class-S algorithm constructs a valid schedule if and only if the SDF graph is sample rate consistent. In other words, each fireable (executable) actor may be repeatedly scheduled, updating the vector accordingly, until no actor is fireable, and all actors have been scheduled exactly the number of times specified by the repetitions vector. This simple valid scheduling approach is an efficient way to quickly assess the consistency of the SDF diagram before attempting more complex, e.g., optimized, scheduling.

In one embodiment, the second data flow diagram may be implemented as a more general case of SDF, specifically, a cyclostatic data flow (CSDF) diagram. A CSDF diagram may support cyclically changing but predefined behavior, and may allow a higher degree of parallelism, and thus higher throughput and lower memory requirements. However, scheduling may be substantially more complicated due to the increased generalization. In another embodiment, the second data flow diagram may be implemented as a parameterized data flow diagram.

In one embodiment, the computed periodic schedule may be optimized. In one embodiment, the periodic schedule may be optimized based on a specified target for the diagram, e.g., a single processor target. In other embodiments, the periodic schedule may be optimized with respect to various metrics, including for example, one or more of: program memory, buffer memory, context switch overhead, and performance, among other parameters.

In one embodiment, e.g., for single processor targets, program memory required may be minimized by a schedule in which each actor appears only once. For example, in the schedule ABBABCCA, each actor appears multiple times, while in the schedule (3AB)(2C), each actor makes only a single appearance. This approach may also minimize the overhead of a function call, which may be significant with actors of small granularity. Note that this approach is only valid due to the fact that SDF assumes that each appearance of an actor in the schedule is actually inlined code, and not a function call.

Note that by generating an intermediate representation of the schedule prior to converting the diagram to LabVIEW code (i.e., G code), other, more elaborate, scheduling algorithms may be easily implemented.

In one embodiment, the optimization may include scheduling loops (and their enclosed elements) in the following manner:

First, non-trivial strongly connected elements or components of the diagram may be determined. The elements or components may then be clustered, thereby generating an acyclic graph. The acyclic graph may then be scheduled by applying a topological sort and generating a schedule accordingly, where each cluster is invoked by its repetition count.

For each cluster, a sub-independent partitioning algorithm may be applied to partition the cluster into sub-independent partitions. If the sub-independent partitions are sub-independent of one another, connected components or elements of each partition may be determined, and the loop scheduling algorithm applied recursively to each partition, replacing the original schedule with the respective schedules for each partition, and so forth. If, on the other hand, the diagram (i.e., the partitions) is determined to be tightly interdependent the simple scheduling approach described above may be used to determine a valid schedule for each cluster.

As mentioned above, in some embodiments at least a portion of the data flow diagram, i.e., the SDF diagram, may be deployed to a programmable hardware element, e.g., an FPGA, and executed thereon. As an example, the SDF diagram of FIG. 16A will be considered. In this embodiment, an optimized schedule may be constructed in the following manner, although it should be noted that approach described is meant to be exemplary, and is not intended to limit the optimization techniques or algorithms to any particular form or function.

First, the size of the FIFO queues for each edge may be set to the upper bound on the total number of tokens accumulated on the edge per periodic invocation. Referring back to FIG. 16A, actor A produces one token per firing, and actor B consumes two tokens per firing. The edge connecting the two actors has a delay of 3, as indicated. Thus, in this example, the maximum number of tokens is equal to the repetition rate of B times the number of tokens consumed by B, plus the delay, or:

Max # tokens=1*2+3=5.

Each actor may then be placed inside an independent infinite while loop. Note that since queues are of fixed size, are bounded by the total number of tokens accumulated per period, and are blocking, a deadlock free valid schedule may be assured. Each actor may then execute as fast as possible on its own execution system, thus facilitating parallelism. Note that this approach is particularly suited for deployment onto programmable hardware elements, such as FPGAs.

Then, the first data flow diagram, e.g., a LabVIEW (G) diagram, may be generated based on the determined valid schedule. For example, for single processor targets, the intermediate representation of the schedule may be parsed and used to generate the first data flow diagram with first data flow semantics, e.g., a LabVIEW diagram, i.e., the intermediate representation of the schedule may be parsed and converted to a G diagram.

In a preferred embodiment, the first data flow diagram includes an infinite outer while loop, with a combination of sequence structures and for loops to control execution of the graphical program elements, based upon the dependencies of the actors (e.g., the topology of the SDF diagram and/or the valid schedule for the SDF diagram).

Figure 21A:
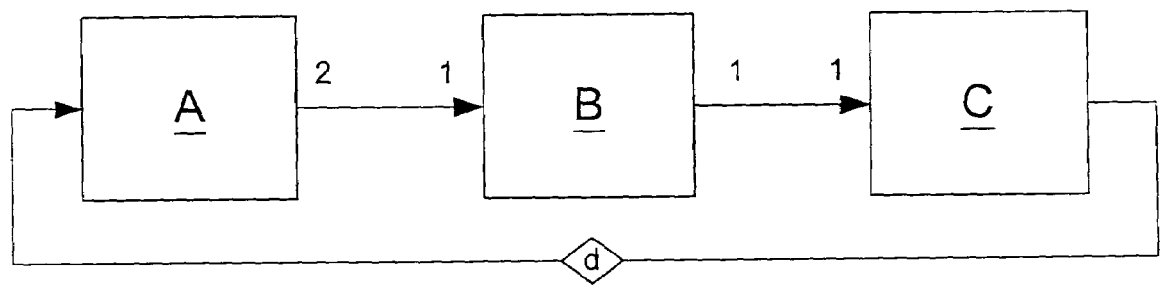
FIGS. 21A and 21B illustrate a simple SDF diagram and corresponding LabVIEW diagram, according to one embodiment.
Figure 21B:
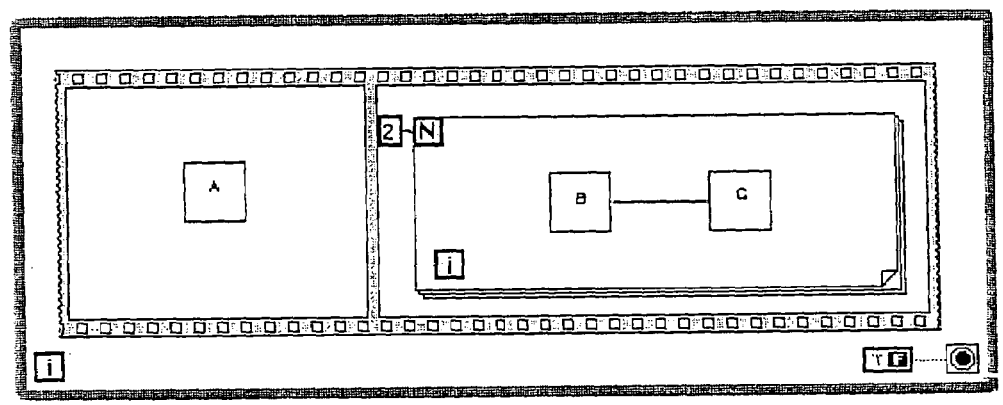

FIGS. 21A and 21B—Sample Conversion of SDF Diagram to LabVIEW Diagram

FIGS. 21A and 21B illustrate a simple SDF diagram and corresponding LabVIEW diagram. As FIG. 21A shows, this SDF diagram includes three actors, A, B, and C, each operable to perform a respective specified function, where A produces two tokens per firing, B consumes and produces one token per firing, and C consumes one token per firing. As FIG. 21A also shows, a wire implements a feedback cycle that feeds the output of actor C back to the input of actor A. As described above, the diamond on the feedback wire signifies a delay element, and specifies the initial number of tokens available on that wire. The delay element is necessary when feedback is present to ensure that the graph does not deadlock. It is noted, however, that this element is not limited to only feedback wires and may be present in other wires as well.

In a preferred embodiment, converting an SDF diagram with the second data flow semantics to a data flow diagram with the first data flow semantics preferably includes generating a companion diagram, similar to that described above with respect to the simulation diagram, where the companion diagram implements the functionality (and the second data flow semantics) of the SDF diagram, but where the implementation itself operates in accordance with the first data flow semantics, e.g., a G diagram using the semantics allowable in LabVIEW. In other words, the SDF diagram may correspond to a companion diagram in accordance with the first data flow semantics, where executing the SDF may comprise executing the companion diagram As described above, a repetitions vector for the SDF diagram may be computed. In this case, the repetitions vector is qG=[1,2,2], specifying the rates of execution for A, B and C, respectively.

Then, a valid schedule may be determined based on the repetitions vector, optionally according to some optimizing criterion such as minimizing the program memory size, and/or buffer memory size. In various embodiments, the scheduling algorithms may also optimize for single processor scheduling, multi-processor scheduling, and/or parallel hardware scheduling. Other optimizations such as graph retiming may also be included to improve the performance of the system. A sample valid schedule that may be substantially optimal for program and buffer memory size for the example SDF diagram of FIG. 21A may be: A(2BC). According to this schedule, A fires first, then BC fires twice. As noted above, the code is preferably inlined, and thus schedules where each actor appears only once may be desired to minimize program memory size.

A G data flow diagram (a LabVIEW diagram) may then be generated or scripted to implement the schedule. In a preferred embodiment, the schedule (e.g., as an intermediate form of the SDF diagram) may be parsed, and a plurality of graphical program elements, e.g., LabVIEW graphical program elements, determined. These primitives may then be assembled in the companion diagram, as described above.

FIG. 21B illustrates one embodiment of the G data flow diagram (i.e., a LabVIEW diagram) based on the SDF diagram of FIG. 21A. Note that the diagram includes an outer while loop, an enclosed sequence structure delineating nodes A from B and C, and a for loop enclosing nodes B and C, where the for loop is specified to execute two times per execution of the sequence structure. Thus, B and C will execute twice for each time A executes, as expected. In one embodiment, A, B, and C may each include queuing structures that allow data transfer between these blocks.

Finally, the companion diagram, e.g., the generated G diagram, may optionally be targeted to a particular platform. For example, the G diagram may be deployed to an embedded platform, such as an FPGA. For further information regarding deployment of graphical programs to FPGAs, please see U.S. Pat. No. 6,219,628, titled "System and Method for Converting Graphical Programs Into Hardware Implementations", which was incorporated by reference above.

In some cases, different diagrams may be scripted or generated for different targets, e.g., due to differing constructs required in specifying queues and/or input/output. Thus, in some embodiments, the generated G diagram itself may be an intermediate form for the final version of the deployed data flow diagram, where, for example, target specific constructs may be generated depending on the intended target.

In one embodiment, the multi-rate nodes or actors may be implemented based on the external nodes, as described above with respect to simulation nodes. For example, an external node may wrap a regular LabVIEW subVI with special encodings to denote token production/consumption rates, dependencies, and appearance in the SDF diagram.

In one embodiment, SDF actors may only be placed in SDF diagrams. Conversely, in some embodiments, there may be restrictions on which LabVIEW functions, e.g., subVIs or nodes (e.g., via the wrapping mentioned above) may be included in SDF diagrams. For example, in one embodiment, only multi-rate nodes and basic numeric, comparison, and analysis functions may be utilized. In one embodiment, only functions that take scalar values may be allowed. In other embodiments, functions that take array values (i.e., vectors) may be allowed. Note that due to SDF semantics, in preferred embodiments, data-dependent execution is not allowed in the SDF diagram.

Thus, using the SDF diagram, the user may specify systems which have varying rates, such as decimators and interpolators, among others. The SDF diagram may then be scripted into an equivalent G data flow diagram (e.g., a G block diagram) based on scheduling algorithms specific for synchronous data flow diagrams. The equivalent G block diagram may then be targeted to the various platforms on which LabVIEW is running or supported.

Example: A Simulink to LabVIEW Translator

A specific example of conversion of a data flow diagram with second data flow semantics to a data flow diagram with first data flow semantics relates to the Simulink graphical simulation system, provided by the Mathworks, Inc. Simulink is a widely recognized and used system in the simulation domain. Many simulation developers and users, corporate and educational, have vast existing Simulink resources in the form of experience and software model files, e.g., .MDL files. One embodiment of the present invention may facilitate translation of those model files from Simulink to LabVIEW simulation, thereby allowing these users to retain much of their existing work and resources. The translation process may also be leveraged to produce virtually unlimited examples for use as a learning tool for those experienced with the Simulink paradigm, but wishing to master the same concepts in LabVIEW simulation. It should be noted that any of the techniques and approaches described below may also be applied to translations between other types of data flow semantics, or between other graphical programming semantics and protocols in general.

Simulink is a tool for modeling, simulating, and analyzing dynamic, physical systems. Simulink utilizes numeric integration and analysis techniques to approximate solutions to systems of ordinary differential equations (ODEs) that model physical phenomena. Simulink represents "systems" using a block diagram approach that is very similar to that employed by LabVIEW. Roughly, the notion of a Simulink "system" maps to the LabVIEW concept of a VI. Simulink systems are in turn made up of wired "blocks" through which data moves in a manner very similar to LabVIEW dataflow. The blocks can represent either primitive functions much like LabVIEW primitives or "SubSystems" which are conceptually equivalent to LabVIEW subVIs. Simulink also provides a block called an "S-Function block" which provides an external interface to code compiled in traditional languages such as C and ADA that is similar to the LabVIEW call-library node. Simulink systems allow feedback on the diagram, similar to the simulation diagrams described above.

In one embodiment, the Simulink to LabVIEW translator may provide an interface for a user to select one or more Simulink MDL files and may perform the translation of those files as accurately as possible. The MDL file contains a hierarchical definition of the system and the blocks, lines, and subsystems contained within. The Simulink system may be translated into a top-level VI comprising a simulation diagram that contains LabVIEW primitives, wires, and subVIs corresponding to the contents of the MDL file, such as the simulation diagrams described above in detail.

Common Graph Description

The Simulink .MDL file may be translated to another hierarchical format containing a description of nodes and edges making up a graph, e.g., to a common graph description (CGD) stored in a graph description file. The hierarchical format is easily described as a directed acyclic graph (DAG) and maps in a relatively straightforward manner into LabVIEW's programming model. In one embodiment, a set of VIs or nodes may be provided to wrap the scripting VIs and map cleanly to this graph description file, thus facilitating the conversion or translation from virtually any flow semantics to a generic graph semantics, e.g., the common graph description, in the form of the graph description file, also referred to as the CGD file. The generic graph semantics may then be converted or translated to any other desired flow semantics, e.g., the first data flow semantics, e.g., LabVIEW. In other words, virtually any flow diagram may be converted to a graph description, which may then be converted to LabVIEW (or any other flow diagram). This approach may also facilitate translation from LabVIEW (or any other flow diagram) to any another language that maps to the graph description file. Thus, the graph description file (or equivalent) may allow translations or conversions between virtually any two flow semantics, e.g., between Simulink and LabVIEW diagrams. Other example conversions between flow semantics include System Build (provided by MATRIXx) to/from LabVIEW and MathScript (shareware) to/from LabVIEW, among others, where each conversion preferably uses the graph description file or format to define the translated VIs or diagrams.

High-Level Overview of the Translation Process

In one embodiment, the Simulink to LabVIEW translator may comprise two parts. The first may translate the .MDL file to the CGD format. The second may generate the G code corresponding to the CGD file. This two part approach may allow for easier implementation of future translators, as they may only need to implement the first part, since the second part may be generic or common to all translators that generate G code from the CGD file.

In one embodiment, external data files may be used to map Simulink blocks to different CGD elements. This may allow users to create direct mappings to custom blocks, e.g., in the form of text mapping files, and so the actual subsystem or subVI may be created for a given Simulink block, rather than just a placeholder. These mappings may also simplify upgrades, e.g., when MathWorks introduces new blocks in later revisions of Simulink, because new entries corresponding to the new blocks may simply be added to the text mapping file rather than rebuilding the translation engine.

After a CGD file has been created, the G generator may read the file and script the necessary VIs based on the CGD of the original diagram, e.g., the Simulink diagram. In a preferred embodiment, the G generator may have a similar text based mapping file to facilitate custom LabVIEW or G blocks and upgrades to new VIs. In one embodiment, a tool, program, or node (e.g., a VI) may be provided to simplify the process of creating new mappings.

As is well known in the art, conversion of a graphical program, such as a data flow diagram (e.g., LabVIEW) or control block diagram (e.g., Simulink) may require a parser, thus, in a preferred embodiment, the first part of the Simulink to LabVIEW translator comprises a parser, more details of which are provided below.

In one embodiment, the translator may support error handling. For example, in one embodiment, the parser may be able to recover from errors and to report any problems encountered during the translation to users. In one embodiment, the error handling may also allow a user to locate and manually correct any such errors, e.g., by providing indexing and auxiliary information, e.g., including text descriptions of the errors. For example, in one embodiment, when the parser encounters an error, it may flag the error and pass it along to the generator (i.e., a G-generator). The G-Generator may then store a reference to the offending LabVIEW object once it has been scripted, e.g., once G code has been generated, as well as an error or warning message. In one embodiment, the parser may generate placeholder blocks in place of any Simulink block that it cannot map or that it fails to translate.

In some cases, the file format for the original semantics (e.g., Simulink .MDL file format) may change, e.g., when revisions to Simulink are released. Thus, in one embodiment, the translator may be associated with or tied to a particular Simulink release, and thus, may include version or revision information, e.g., corresponding to the appropriate Simulink revision. As noted above, this complication may be mitigated somewhat by the two-step translation process, in that the G-generator component may remain unchanged. For example, a mapping file update may be all that is needed to adjust to changes in the .MDL file format, with the worst case being a revision of the entire parser module.

In one embodiment, the above techniques may also be used to translate text based programs to G (or any other flow semantics). For example, translators may be provided to translate between Xmath or other text based languages and G. Similarly, translators may also be provided according to the present invention for translating between other simulation packages, e.g., MATRIXx System Build, etc., and LabVIEW or G, as mentioned above.

Example Parser

The following describes one embodiment of a parser for parsing a Simulink .MDL file and creating a corresponding CGD file. Simulink stores its files in a text format that includes a hierarchical list of Blocks and Lines as well as a variety of parameter settings for each block, model, system, etc., referred to as a .MDL file.

.MDL Format

The following is an abbreviated example of the structure of a Simulink .MDL file.

```
Model {
    Name "masssprg"
    Version 4.00
    ...
    System {
        Name "masssprg"
        Location [328, 77, 826, 467]
        ...
        Block {
            BlockType Gain
            Name "Gain1"
            Position [310, 150, 340, 180]
        ...}
        Line {
            SrcBlock "Gain1"
            SrcPort 1
        ...}
    ...}
...}
```

Figure 22:
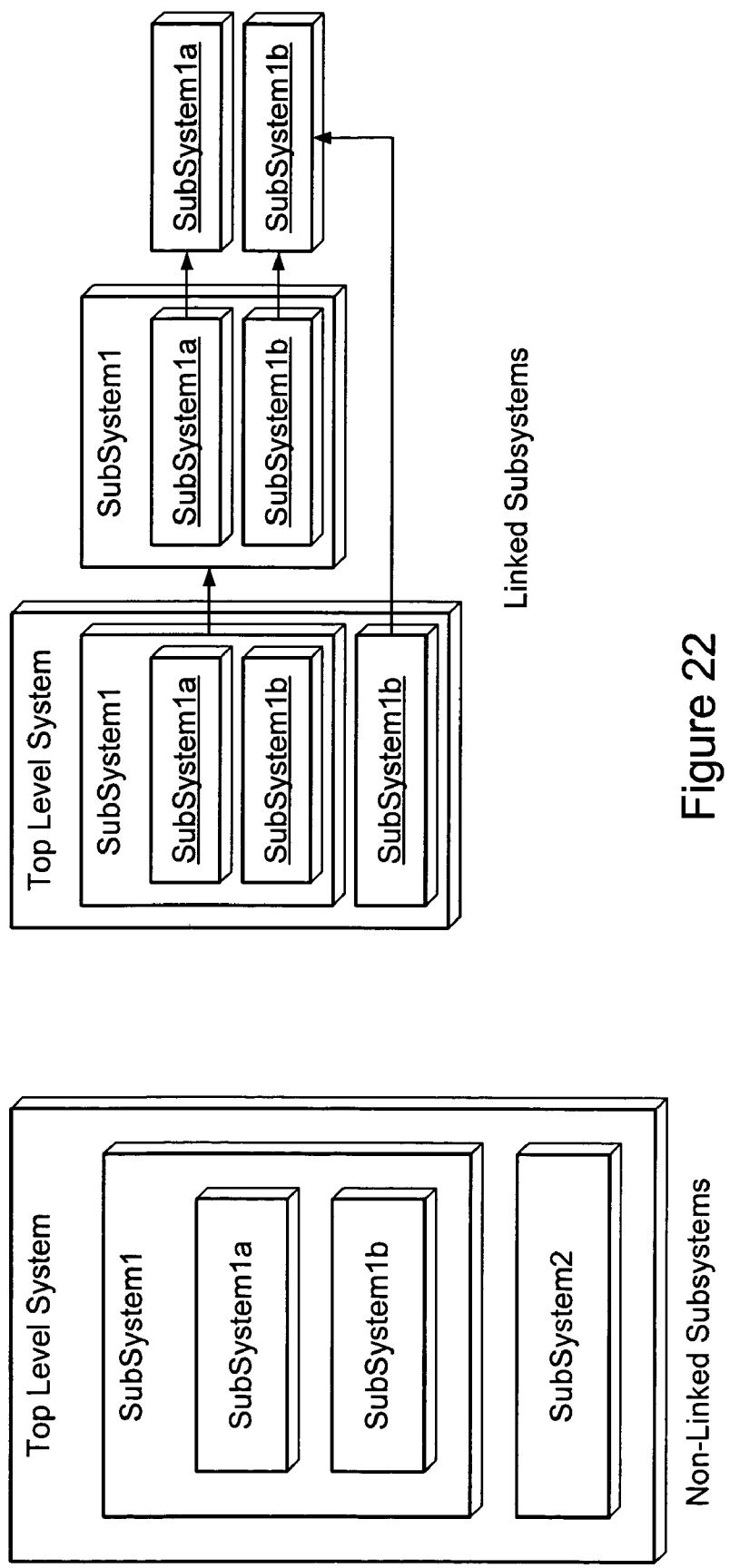
FIG. 22 illustrates non-linked subsystems versus linked subsystems, according to one embodiment.

FIG. 22—Simulink Subsystems

In addition to simple blocks and lines, Simulink MDL files typically contain subsystem blocks which are functionally equivalent to LabVIEW's subVIs. A subsystem may be either linked or non-linked. A linked subsystem takes the form of a reference block containing a parameter describing the location of the subsystem in an external file, while a non-linked subsystem has a body that is fully defined inside the parent .MDL file. Often, users may build one or more MDL files containing libraries of subsystems which may then be linked into other MDL files. FIG. 22 illustrates non-linked versus linked subsystems. Note that the hierarchy of a non-linked subsystem is a tree, while the linked subsystem is hierarchically a DAG (directed acyclic graph).

Additionally, in one embodiment, subsystems may be masked, e.g., may have a user-definable configuration page that may pop-up, e.g., in response to double-clicking the subsystem or a reference to the subsystem. The configuration page preferably allocates named variables that may be accessed anywhere within the scope of the subVI and its children.

In one embodiment, the translator may handle subsystems by extracting (harvesting) or determining their contents and generating subVIs for each. As noted earlier, linked-subsystems are inherently distinct from non-linked subsystems since a single linked subsystem may be referenced from multiple parent systems. Therefore, in a preferred embodiment, two passes through the Simulink diagram may be made, a first pass for determining or harvesting the linked subsystems and a second pass for non-linked subsystems.

Common Graph Description

In one embodiment, the common graph description (CGD) may be stored as XML. For example, the root element may be a <graph>. The <graph> may be a complex data type that may contain several elements within it, including more <graph> elements. Additional complex data types include <node> and <edge> elements. Other elements may be located within one or more of these blocks. The following is one example of a graph description:

```
<graph name="mass spring">
    ...
    <graph name="subsystem" subsystem=true>
        ...
    </graph>
    <node name="gain" xsi:type="gain">
        <gain>-0.2</gain>
        ...
    </node>
    <edge>
        <source>integrator\in1</source>
        <destination>gain1\in1</destination>
        ...
    </edge>
    ...
</graph>
```

Note that a graph may contain another graph. This format may be used to represent both subsystems and subVIs. The distinction between subsystems and subVIs may be noted in an optional attribute of the graph type. The CGD format is substantially consistent with the typical layout of a DAG, simply recording the nodes and the edges between them. In one embodiment, the source and destination of the edges may be described by the unique node name and the unique name of a terminal on the node. Inputs and outputs to the graph itself may be indicated by a period in place of the node name.

An XML schema may be created to validate any CGD file, and may define data types and dictate required and optional attributes and elements. Using an XML schema may ensure that the G generator is capable of using any CGD file created in accordance with the schema.

Parser Operation

In one embodiment, the first stage in the translation process is the parsing of the .MDL file to generate an intermediate CGD file. In one embodiment, the parser may be operate as follows:

1. Parser Initialization: Read in the block mapping and any other auxiliary files, storing the results in data structures encapsulating the state of the parser.

2. Linked Subsystem Resolution: Scan each block of the MDL file. For each reference block to a linked-subsystem:
   a. Check if this linked-subsystem has already been encountered.
   b. Locate the subsystem on disk and read in its contents.
   c. Add subsystem to list and note dependency of parent block.
   d. Generate a temporary port-map entry.

2. Walk down the growing array of subsystems, scanning each subsystem for nested references. For each reference found, check to see whether it has been encountered before. If so, note the dependency and continue; if not, read the new block in, note the dependency, and add it to the end of the list. Note that this process is a breadth-first traversal of the diagram.

Once all linked references have been resolved, dependency sort the list of subsystems such that every subsystem upon which a given system is dependent comes before the dependent system. The ordering is may be necessary so that every subVI that is needed by a parent VI may be scripted or generated before attempting to script the parent itself.

3. Non-linked Subsystem Resolution: Walk the list containing the parent system and all of its linked subsystems, and for each, find all non-linked subsystems and insert their bodies immediately prior to their parent in the list, resulting in a list containing all of the subsystems of the model followed by the top level system. Note that in the sorted list, no subsystem comes before another subsystem upon which it is dependent.

4. CGD Generation: The parser may then subdivide each of the subsystems in the list into logical components (blocks, lines, etc.), and may then use this information to generate a corresponding graph description. In one embodiment, each time a block is encountered, the parser may look up the Block Type in the mapping. If found, the result may contain information about which CGD block to use in place of the Simulink block, as well as parameter mappings and/or other useful information.

5. Error-Handling: When a block is encountered that cannot be mapped for some reason, a placeholder block may be created and/or inserted in its place. Any other errors encountered during the parsing process may be passed along to the user at this point and may halt the translation if necessary.

Example G Generator

After parsing the MDL file into a Common Graph Description file, the CGD may then be fed into a G Generator that may use VI scripting to build the equivalent LabVIEW VIs. This may drive the generation of LabVIEW VIs via VI scripting. The G generator may be responsible for translating CGD blocks to the corresponding LabVIEW VIs and primitives based on another mapping file. In one embodiment, the G Generator may operate as follows:

1. Generator Initialization: Read in the block mapping and any other auxiliary files, storing the results in data structures encapsulating the state of the parser.

2. Subsystem Creation: All sub-graphs should already be listed in the CGD in the order in which they will be required, e.g., with sub-graphs listed before any others that are dependent upon them, and before the nodes where they are placed on the top-level graph. The generator may operate on a single pass through the CGD file, since the parser should have ordered everything as needed. In one embodiment, all graph header information and sub-graph descriptions may come first, so they may be generated as they are encountered. A mapping file may be referenced to convert from CGD elements to their corresponding LabVIEW primitives and VIs.

3. System Creation: Next, the nodes on the graph may be placed, e.g., in a LabVIEW data flow diagram, including any sub-graphs. Some nodes may represent front-panel controls and indicators and may be placed at this stage as well.

4. Wiring: After all nodes have been place, the defined edges may be generated between them.

5. Error-Handling: Any sub-graphs that are created as placeholders may generate an error message, so that the user is made aware of what could not be translated directly. Any other errors encountered during G generation may also be passed along to the user.

In a preferred embodiment, the translator may be simple for most users to operate. The primary interaction may be to select the MDL file to be translated, and possibly to set a small number of options. Advanced users may need or desire additional information regarding creating their own mappings from Simulink blocks or to LabVIEW primitives and VIs, and so this type of information may be provided. Additional information may be provided explaining possible failures in the translation process and suggestions as to what to do if an untranslatable block is encountered. In one embodiment, a warning against translating copyrighted material may also be included.

Thus, various embodiments of the systems and methods described above may allow diagrams such as data flow diagrams, i.e., graphical programs, to be developed that have or support multiple data flow semantics. Additionally, data flow diagrams, or portions of data flow diagrams, that have or support one data flow semantics may be programmatically converted to, or used to generate, data flow diagrams, or portions of data flow diagrams, that have or support a different data flow semantics. In some embodiments, translators may facilitate conversion or translation between diagrams that use different semantics and/or syntax, optionally via an intermediate graph description.

Although the embodiments above have been described in considerable detail, numerous variations and modifications may become apparent to those skilled in the art once the above disclosure is fully appreciated. It is intended that the following claims be interpreted to embrace all such variations and modifications.

We claim:

1. A memory medium that stores program instructions for creating a graphical program, wherein the program instructions are executable to perform:
   assembling a first plurality of graphical program elements in a graphical program in response to first input, wherein the assembled first plurality of graphical program elements comprise a plurality of interconnected graphical program elements, wherein the assembled first plurality of graphical program elements have a first model of computation, and wherein the first model of computation specifies a homogenous data flow model of computation;
   displaying a structure in the graphical program in response to second input, wherein the structure comprises an interior portion, wherein the structure indicates use of a second model of computation for graphical program elements comprised within the interior portion of the structure; and
   assembling a second plurality of graphical program elements within the interior portion of the structure in response to third input, wherein the assembled second plurality of graphical program elements comprised within the interior portion of the structure have the second model of computation;
   wherein the graphical program is executable to perform a function.

2. The memory medium of claim 1, wherein the program instructions are further executable to perform:
   executing the graphical program, wherein said executing comprises:
      executing the assembled first plurality of graphical program elements in accordance with the first model of computation; and
      executing the assembled second plurality of graphical program elements in accordance with the second model of computation.

3. The memory medium of claim 2, wherein the program instructions are further executable to perform:
   converting the assembled second plurality of graphical program elements having the second model of computation into a third plurality of graphical program elements having the first model of computation;
   wherein said executing the assembled second plurality of graphical program elements in accordance with the second model of computation comprises executing the third plurality of graphical program elements in accordance with the first model of computation.

4. The memory medium of claim 2, wherein the program instructions are further executable to perform:
   converting the assembled first plurality of graphical program elements having the first model of computation into a third plurality of graphical program elements having the second model of computation;
   wherein said executing the assembled first plurality of graphical program elements in accordance with the first model of computation comprises executing the third plurality of graphical program elements in accordance with the second model of computation.

5. The memory medium of claim 1, wherein the first model of computation specifies a single rate execution of graphical program elements.

6. The memory medium of claim 1, wherein the first model of computation does not include explicit feedback connections to implement looping.

7. The memory medium of claim 1, wherein the first model of computation enables specification of parallelism of graphical program elements.

8. The memory medium of claim 1,
   wherein the first model of computation specifies a single rate execution of graphical program elements; and
   wherein the first model of computation does not include explicit feedback connections to implement looping.

9. The memory medium of claim 1, wherein the first model of computation comprises graphical structure nodes that specify looping, wherein the graphical structure nodes do not include explicit feedback connections to implement looping.

10. The memory medium of claim 1, wherein the first model of computation comprises graphical structure nodes that specify conditional branching of operations.

11. The memory medium of claim 1, wherein the first model of computation comprises graphical structure nodes that specify sequencing of operations.

12. The memory medium of claim 1,
   wherein the graphical program comprises a data flow diagram;
   wherein the first model of computation comprises a first data flow semantics; and
   wherein the second model of computation comprises a second data flow semantics.

13. The memory medium of claim 1, wherein the first model of computation comprises a basis model of computation operable to implement the second model of computation.

14. The memory medium of claim 1, wherein the second model of computation comprises a basis model of computation operable to implement the first model of computation.

15. The memory medium of claim 1, wherein the second model of computation supports a multi-rate execution of graphical program elements.

16. The memory medium of claim 1, wherein the second model of computation includes explicit feedback connections to implement looping.

17. The memory medium of claim 1,
   wherein the second model of computation specifies a multi-rate execution of graphical program elements; and
   wherein the second model of computation includes explicit feedback connections to implement looping.

18. The memory medium of claim 1, wherein the second plurality of graphical program elements comprises a control block diagram utilizing control block notation.

19. The memory medium of claim 1, wherein the second plurality of graphical program elements comprises a simulation diagram, wherein at least a subset of the second plurality of graphical program elements comprise simulation nodes, and wherein the simulation diagram implements a simulation.

20. The memory medium of claim 19, wherein the simulation nodes support direct feed-through and indirect feed-through for inputs and outputs of the simulation nodes.

21. The memory medium of claim 19,
wherein at least one of the simulation nodes comprises a plurality of inputs and a plurality of outputs;
wherein a first output of the plurality of outputs requires only a subset of the plurality of inputs; and
wherein the least one of the simulation nodes is operable to fire upon reception of the subset of the plurality of inputs to generate the first output.

22. The memory medium of claim 19, wherein at least one simulation node of the simulation nodes supports a feedback cycle between an output of the simulation node and an input of the simulation node.

23. The memory medium of claim 22, wherein at least one simulation node of the simulation nodes supports a feedback cycle between an output of the simulation node and an input of the simulation node if:
the input of the simulation node has indirect feed-through to the output of the simulation node.

24. The memory medium of claim 19, wherein at least one of the simulation nodes executes two or more times per execution of the simulation diagram.

25. The memory medium of claim 19, wherein the program instructions are further executable to perform:
computing a feed-through mapping of inputs to outputs for the simulation nodes; and
storing the feed-through mapping.

26. The memory medium of claim 19, wherein the program instructions are further executable to perform:
configuring one or more simulation parameters for the simulation diagram; and
storing the configured one or more simulation parameters;
wherein the configured one or more simulation parameters specify operation of the simulation diagram.

27. The memory medium of claim 19, wherein at least one of the simulation nodes represents a sub-simulation diagram, wherein the sub-simulation diagram comprises two or more additional simulation nodes.

28. The memory medium of claim 27, wherein the program instructions are further executable to perform:
configuring one or more simulation parameters for the sub-simulation diagram; and
storing the configured one or more simulation parameters;
wherein the configured one or more simulation parameters specify operation of the sub-simulation diagram.

29. The memory medium of claim 27, wherein the two or more additional simulation nodes are operable to execute in the simulation diagram in an inlined manner.

30. The memory medium of claim 19, wherein the structure comprises a simulation loop structure enclosing the second plurality of graphical program elements, and wherein the simulation loop is operable to execute the simulation diagram one or more times to advance the simulation one time step.

31. The memory medium of claim 30,
wherein the simulation loop structure comprises a loop iterator terminal and a stop terminal;
wherein the loop iteration terminal is incremented upon the beginning of a time step;
wherein the stop terminal is evaluated at the end of a time step; and
wherein the simulation is operable to stop at a specified stop time or when the evaluation of the stop terminal indicates that the simulation is to stop.

32. The memory medium of claim 31, wherein the structure comprises a multi-rate loop structure enclosing the second plurality of graphical program elements, and wherein at least two of the second plurality of graphical program elements have different execution rates.

33. The memory medium of claim 32, wherein the second plurality of graphical program elements comprise an SDF diagram.

34. The memory medium of claim 33, wherein the second plurality of graphical program elements comprise SDF nodes interconnected via one or more edges, and wherein each edge specifies a first-in, first-out (FIFO) buffer and a delay.

35. The memory medium of claim 34, wherein each SDF node is specified to consume a respective first number of tokens, and is further specified to produce a respective second number of tokens, and wherein the delay for each edge specifies an initial number of tokens residing on that edge.

36. The memory medium of claim 35, wherein the program instructions are further executable to perform:
computing a repetitions vector for the SDF diagram, wherein the repetitions vector specifies a respective number of times each SDF node should fire to consume all tokens.

37. The memory medium of claim 30, wherein the simulation loop structure comprises one or more terminals comprising:
an input terminal for inputting one or more simulation parameters;
an error input terminal for inputting error information to the simulation diagram; and
an error output terminal for outputting error information from the simulation diagram.

38. The memory medium of claim 37, wherein the one or more simulation parameters comprises one or more of:
iteration memory medium;
start time;
stop time;
time step for the simulation;
minimum and maximum time step sizes; and
integrator tolerance.

39. The memory medium of claim 33, wherein the program instructions are further executable to perform:
configuring one or more parameters for the SDF diagram; and
storing the configured one or more parameters;
wherein the configured one or more parameters specify operation of the SDF diagram.

40. The memory medium of claim 33,
wherein the SDF diagram corresponds to a companion diagram in accordance with the first model of computation; and
wherein executing the SDF comprises executing the companion diagram.

41. The memory medium of claim 34, wherein the program instructions are further executable to perform:
computing a valid periodic schedule for the SDF diagram based on the repetitions vector.

42. The memory medium of claim 41, wherein said computing the valid periodic schedule for the SDF diagram is performed at compile time.

43. The memory medium of claim 41, wherein the program instructions are further executable to perform:
optimizing the periodic schedule regarding one or more of:
program memory;
buffer memory;
context switch overhead; and
performance.

44. The memory medium of claim 19,
wherein the simulation diagram corresponds to a companion diagram in accordance with the first model of computation; and wherein executing the simulation diagram comprises executing the companion diagram.

45. The memory medium of claim 1, wherein the program instructions are further executable to perform:
providing debug information for the assembled first plurality of graphical program elements in accordance with the first model of computation; and
providing debug information for the assembled second plurality of graphical program elements in accordance with the second model of computation.

46. The memory medium of claim 1, wherein the program instructions are further executable to perform:
receiving debug input for the assembled first plurality of graphical program elements in accordance with the first model of computation; and
receiving debug input for the assembled second plurality of graphical program elements in accordance with the second model of computation.

47. The memory medium of claim 1, wherein the second model of computation specifies a synchronous data flow (SDF) model of computation.

48. The memory medium of claim 1, wherein the program instructions are further executable to perform:
converting at least a portion of the graphical program into a form suitable for deployment on a programmable hardware element.

49. The memory medium of claim 48, wherein the program instructions are further executable to perform:
deploying the converted at least a portion of the graphical program onto the programmable hardware element; and
executing the graphical program, wherein said executing comprises executing the converted at least a portion of the graphical program on the programmable hardware element.

50. The memory medium of claim 1, wherein the second model of computation specifies one or more of:
cyclostatic data flow; and
parameterized data flow.

51. The memory medium of claim 1,
wherein the graphical program comprises a plurality of interconnected nodes that visually indicate functionality of the graphical program.

52. The memory medium of claim 1, wherein said including a first plurality of graphical program elements in a graphical program in response to first input comprises:
arranging a plurality of nodes on a display; and
interconnecting the plurality of nodes.

53. The memory medium of claim 1,
wherein the graphical program comprises a block diagram portion and a user interface portion.

54. The memory medium of claim 1,
wherein the graphical program comprises a heterogeneous graphical data flow program.

55. The memory medium of claim 1,
wherein the graphical program is operable to perform one or more of:
an industrial automation function;
a process control function;
a test and measurement function.

56. The memory medium of claim 1, wherein the program instructions are further executable to perform:
executing the graphical program to perform the function.

57. The memory medium of claim 56,
wherein, during execution of the graphical program, the graphical user interface is displayed on a display of a first computer system and the block diagram executes on a second computer system.

58. The memory medium of claim 56, wherein said executing the graphical program comprises highlighting each graphical program element in the graphical program while the graphical program element is executing.

59. A computer-implemented method for creating a graphical program, the method comprising:
assembling a first plurality of graphical program elements in a graphical program in response to first input, wherein the assembled first plurality of graphical program elements comprise a plurality of interconnected graphical program elements, wherein the assembled first plurality of graphical program elements have a first model of computation, and wherein the first model of computation specifies a homogenous data flow model of computation;
displaying a structure in the graphical program in response to second input, wherein the structure comprises an interior portion, wherein the structure indicates use of a second model of computation for graphical program elements comprised within the interior portion of the structure; and
assembling a second plurality of graphical program elements within the interior portion of the structure in response to third input, wherein the assembled second plurality of graphical program elements comprised within the interior portion of the structure have the second model of computation;
wherein the graphical program is executable to perform a function.

60. A system for creating a graphical program, the system comprising:
a processor;
a memory medium, coupled to the processor; and
an input, coupled to the memory medium and the processor, and operable to receive input;
wherein the memory medium stores program instructions implementing a graphical data flow programming environment, wherein the program instructions are executable by the processor to:
assemble a first plurality of graphical program elements in a graphical program in response to first input, wherein the assembled first plurality of graphical program elements comprise a plurality of interconnected graphical program elements, wherein the assembled first plurality of graphical program elements have a first model of computation, and wherein the first model of computation specifies a homogenous data flow model of computation;
display a structure in the graphical program in response to second input, wherein the structure comprises an interior portion, wherein the structure indicates use of a second model of computation for graphical program elements comprised within the interior portion of the structure; and
assemble a second plurality of graphical program elements within the interior portion of the structure in response to third input, wherein the assembled second plurality of graphical program elements comprised within the interior portion of the structure have the second model of computation;
wherein the graphical program is executable to perform a function.

61. A memory medium that stores program instructions for creating a graphical program, wherein the program instructions are executable to perform:
including a first plurality of graphical program elements in a graphical program in response to first input, wherein the included first plurality of graphical program elements comprise a plurality of interconnected graphical program elements, wherein the first plurality of graphical program elements comprise a first portion of the graphical program in accordance with a first model of computation, wherein the first model of computation specifies a homogenous data flow model of computation;

including a structure in the graphical program, wherein the structure comprises an interior portion, wherein the structure indicates a second portion of the graphical program in accordance with a second model of computation for graphical program elements comprised within the interior portion of the structure; and including a second plurality of graphical program elements within the interior portion of the structure in response to second input, wherein the structure and the second plurality of graphical program elements comprised within the interior portion of the structure comprise the second portion of the graphical program having the second model of computation;

wherein the graphical program is executable to perform a function by:
executing the first portion of the graphical program in accordance with the first model of computation; and
executing the second portion of the graphical program in accordance with the second model of computation.

* * * * *